(12) United States Patent
Kondo

(10) Patent No.: US 10,075,705 B2
(45) Date of Patent: Sep. 11, 2018

(54) IMAGE PROCESSING APPARATUS AND METHOD

(71) Applicant: Sony Corporation, Minato-ku (JP)

(72) Inventor: Kenji Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 502 days.

(21) Appl. No.: 14/344,239

(22) PCT Filed: Oct. 25, 2012

(86) PCT No.: PCT/JP2012/077581
§ 371 (c)(1),
(2) Date: Mar. 11, 2014

(87) PCT Pub. No.: WO2013/065570
PCT Pub. Date: May 10, 2013

(65) Prior Publication Data
US 2014/0294066 A1 Oct. 2, 2014

(30) Foreign Application Priority Data
Nov. 4, 2011 (JP) .................................. 2011-242671

(51) Int. Cl.
*H04N 19/159* (2014.01)
*H04N 19/56* (2014.01)
(Continued)

(52) U.S. Cl.
CPC ..... *H04N 19/00218* (2013.01); *H04N 19/105* (2014.11); *H04N 19/109* (2014.11);
(Continued)

(58) Field of Classification Search
None
See application file for complete search history.

(56) References Cited

U.S. PATENT DOCUMENTS

| 2003/0194009 A1* | 10/2003 | Srinivasan ............. H04N 19/52 375/240.16 |
| 2006/0013321 A1* | 1/2006 | Sekiguchi ...... H04N 21/234309 375/240.27 |

(Continued)

FOREIGN PATENT DOCUMENTS

| JP | 2006-174014 | 6/2006 |
| JP | 2010-50833 | 3/2010 |
| JP | 2010050833 A | * 3/2010 |

OTHER PUBLICATIONS

International Search Report dated Nov. 27, 2012 in PCT/JP2012/077581.

(Continued)

*Primary Examiner* — Kaitlin A Retallick
(74) *Attorney, Agent, or Firm* — Chip Law Group

(57) ABSTRACT

An image processing apparatus includes a controller which controls candidates for an inter prediction mode in which motion compensation is performed based on accuracy of a motion vector, a motion search unit which performs a motion search only in the inter prediction modes allowed by the controller to be the candidates to generate a motion vector, and a motion compensation unit which performs the motion compensation in the inter prediction mode selected from the candidates in each of which the motion vector is generated by the motion search unit to generate a predicted image. The present disclosure is applicable to the image processing apparatus.

15 Claims, 23 Drawing Sheets

(51) Int. Cl.
  *H04N 19/51*   (2014.01)
  *H04N 19/105*  (2014.01)
  *H04N 19/176*  (2014.01)
  *H04N 19/109*  (2014.01)
  *H04N 19/523*  (2014.01)
  *H04N 19/55*   (2014.01)
  *H04N 19/567*  (2014.01)

(52) U.S. Cl.
  CPC ......... *H04N 19/176* (2014.11); *H04N 19/523* (2014.11); *H04N 19/55* (2014.11); *H04N 19/567* (2014.11)

(56) References Cited

U.S. PATENT DOCUMENTS

| | | | | |
|---|---|---|---|---|
| 2007/0206678 A1* | 9/2007 | Kondo | ............... | G06T 3/4053 375/240.17 |
| 2007/0217512 A1* | 9/2007 | Matsuda | ............ | H04N 19/105 375/240.16 |
| 2008/0253457 A1* | 10/2008 | Moore | ............... | H04N 19/52 375/240.16 |
| 2009/0037959 A1* | 2/2009 | Suh | ............... | H04N 21/4345 725/62 |
| 2012/0051431 A1* | 3/2012 | Chien | ............... | H04N 19/105 375/240.16 |
| 2012/0163466 A1* | 6/2012 | Sugio | ............... | H04N 19/139 375/240.16 |
| 2012/0189055 A1* | 7/2012 | Chien | ............... | H04N 19/52 375/240.14 |

OTHER PUBLICATIONS

Kenji Kondo, et al., "Non-CE3: Report on a restriction for small block", Joint Collaborative Team on Video Coding (JCT-VC) of ITU-T SG16 WP3 and ISO/IEC JTC1/SC29/WG11, Document: JCTVC-G392, Nov. 2011, 9 pages.

Benjamin Bross, et al., "WD4: Working Draft 4 of High-Efficiency Video Coding", Joint Collaborative Team on Video Coding (JCT-VC) of ITU-T SG16 WP3 and ISO/IEC JTC1/SC29/WG11, Document JCTVC-F803, Jul. 2011, 226 pages.

* cited by examiner

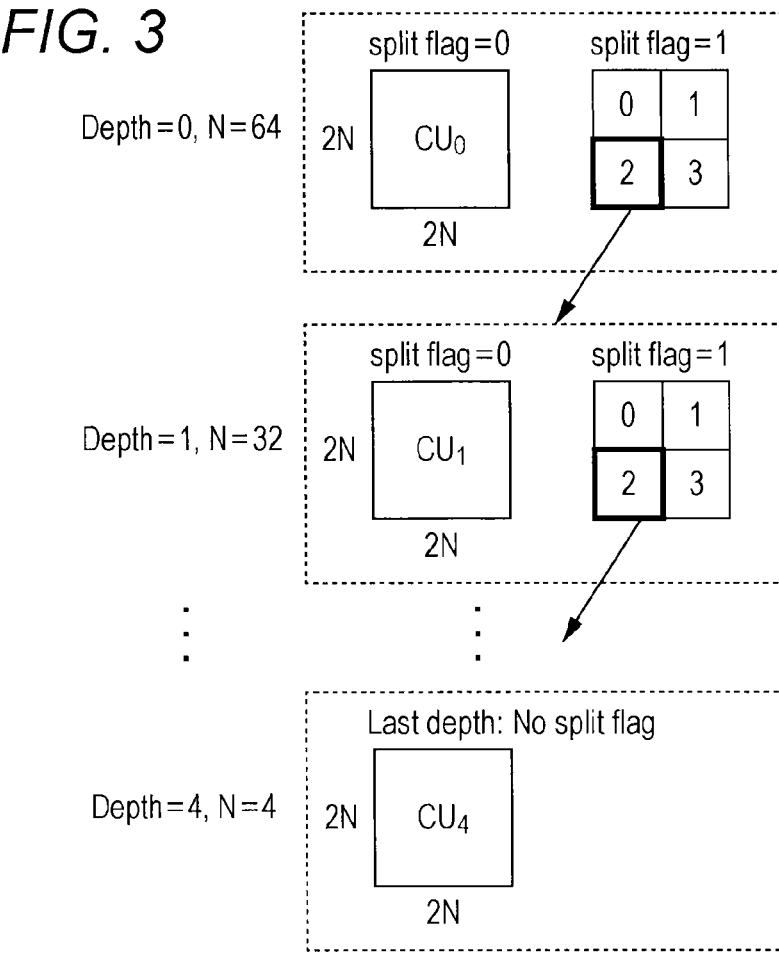

FIG. 4

| Bi/Uni | BH | BV | Sub pel | NUMBER OF INPUT PIXELS |
|---|---|---|---|---|
| Uni | 4 | 4 | integer | 12.0 |
| Uni | 4 | 4 | abc | 15.0 |
| Uni | 4 | 4 | dhn | 18.0 |
| Uni | 4 | 4 | efgijkpqr | 24.0 |
| Uni | 8 | 4 | integer | 7.5 |
| Uni | 8 | 4 | abc | 9.0 |
| Uni | 8 | 4 | dhn | 10.5 |
| Uni | 8 | 4 | efgijkpqr | 13.5 |
| Uni | 4 | 8 | integer | 9.0 |
| Uni | 4 | 8 | abc | 11.5 |
| Uni | 4 | 8 | dhn | 12.0 |
| Uni | 4 | 8 | efgijkpqr | 16.0 |
| Uni | 8 | 8 | integer | 5.5 |
| Uni | 8 | 8 | abc | 6.8 |
| Uni | 8 | 8 | dhn | 7.0 |
| Uni | 8 | 8 | efgijkpqr | 9.0 |
| Uni | 16 | 8 | integer | 3.9 |
| Uni | 16 | 8 | abc | 4.5 |
| Uni | 16 | 8 | dhn | 5.0 |
| Uni | 16 | 8 | efgijkpqr | 6.0 |
| Uni | 8 | 16 | integer | 4.5 |
| Uni | 8 | 16 | abc | 5.6 |
| Uni | 8 | 16 | dhn | 5.3 |
| Uni | 8 | 16 | efgijkpqr | 6.8 |
| Uni | 16 | 16 | integer | 3.2 |
| Uni | 16 | 16 | abc | 3.8 |
| Uni | 16 | 16 | dhn | 3.8 |
| Uni | 16 | 16 | efgijkpqr | 4.5 |

FIG. 5

| Bi/Uni | BH | BV | Sub pel | NUMBER OF INPUT PIXELS |
|---|---|---|---|---|
| Bi | 4 | 4 | integer | 24.0 |
| Bi | 4 | 4 | abc | 30.0 |
| Bi | 4 | 4 | dhn | 36.0 |
| Bi | 4 | 4 | efgijkpqr | 48.0 |
| Bi | 8 | 4 | integer | 15.0 |
| Bi | 8 | 4 | abc | 18.0 |
| Bi | 8 | 4 | dhn | 21.0 |
| Bi | 8 | 4 | efgijkpqr | 27.0 |
| Bi | 4 | 8 | integer | 18.0 |
| Bi | 4 | 8 | abc | 23.0 |
| Bi | 4 | 8 | dhn | 24.0 |
| Bi | 4 | 8 | efgijkpqr | 32.0 |
| Bi | 8 | 8 | integer | 11.0 |
| Bi | 8 | 8 | abc | 13.5 |
| Bi | 8 | 8 | dhn | 14.0 |
| Bi | 8 | 8 | efgijkpqr | 18.0 |
| Bi | 16 | 8 | integer | 7.8 |
| Bi | 16 | 8 | abc | 9.0 |
| Bi | 16 | 8 | dhn | 10.0 |
| Bi | 16 | 8 | efgijkpqr | 12.0 |
| Bi | 8 | 16 | integer | 9.0 |
| Bi | 8 | 16 | abc | 11.3 |
| Bi | 8 | 16 | dhn | 10.5 |
| Bi | 8 | 16 | efgijkpqr | 13.5 |
| Bi | 16 | 16 | integer | 6.4 |
| Bi | 16 | 16 | abc | 7.5 |
| Bi | 16 | 16 | dhn | 7.5 |
| Bi | 16 | 16 | efgijkpqr | 9.0 |
| Bi | 32 | 16 | integer | 5.1 |
| Bi | 32 | 16 | abc | 5.6 |
| Bi | 32 | 16 | dhn | 6.0 |
| Bi | 32 | 16 | efgijkpqr | 6.8 |
| Bi | 16 | 32 | integer | 5.7 |
| Bi | 16 | 32 | abc | 6.8 |
| Bi | 16 | 32 | dhn | 6.3 |
| Bi | 16 | 32 | efgijkpqr | 7.5 |
| Bi | 32 | 32 | integer | 4.5 |
| Bi | 32 | 32 | abc | 5.1 |
| Bi | 32 | 32 | dhn | 5.0 |
| Bi | 32 | 32 | efgijkpqr | 5.6 |

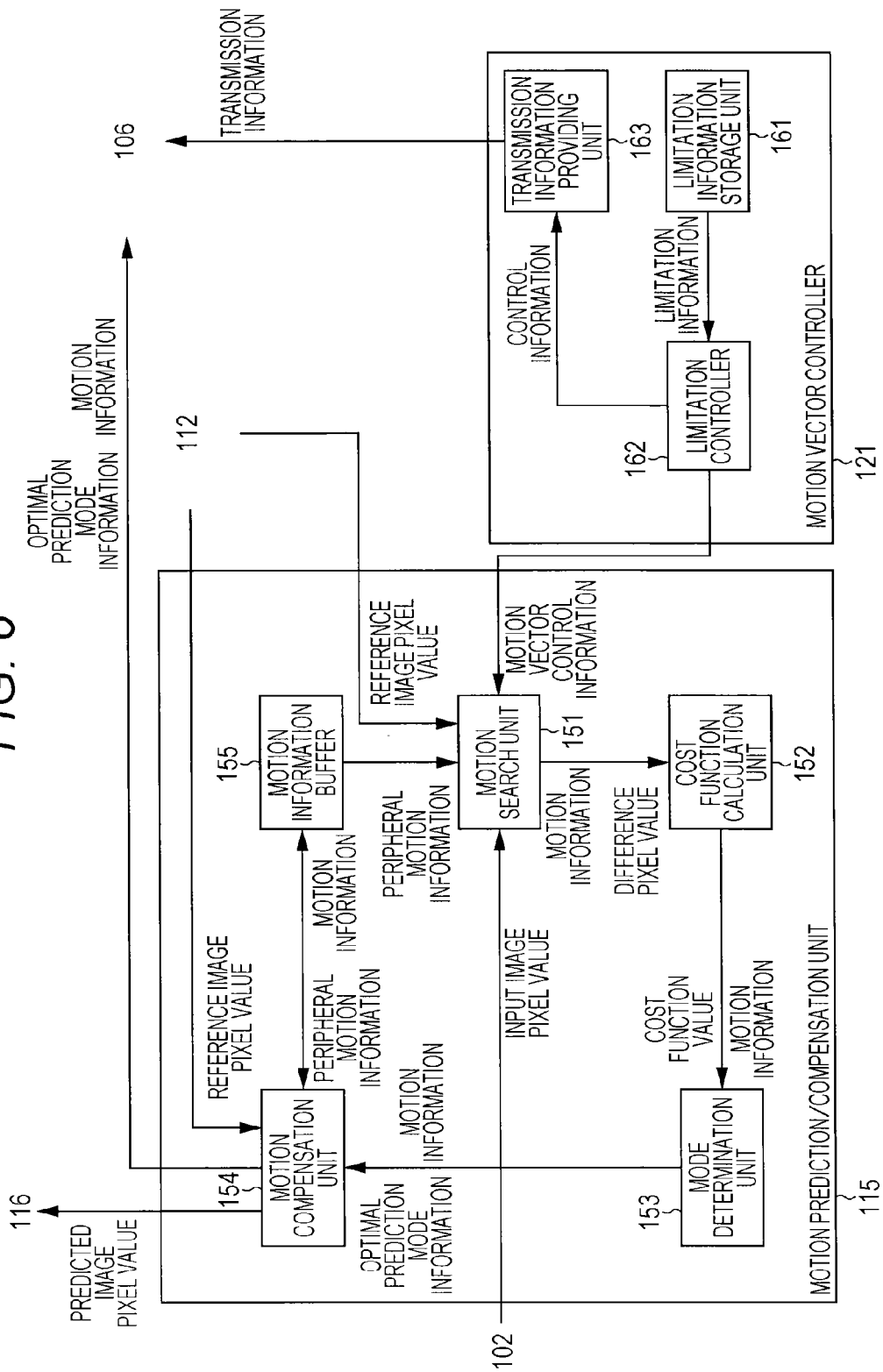

FIG. 11

| Bi/Uni | BH | BV | Sub pel | POSSIBILITY |
|---|---|---|---|---|
| Uni | 4 | 4 | integer | ALLOWED |
| Uni | 4 | 4 | abc | FORBIDDEN |
| Uni | 4 | 4 | dhn | FORBIDDEN |
| Uni | 4 | 4 | efgijkpqr | FORBIDDEN |
| Uni | 8 | 4 | integer | ALLOWED |
| Uni | 8 | 4 | abc | ALLOWED |
| Uni | 8 | 4 | dhn | ALLOWED |
| Uni | 8 | 4 | efgijkpqr | ALLOWED |
| Uni | 4 | 8 | integer | ALLOWED |
| Uni | 4 | 8 | abc | ALLOWED |
| Uni | 4 | 8 | dhn | ALLOWED |
| Uni | 4 | 8 | efgijkpqr | FORBIDDEN |
| Uni | 8 | 8 | integer | ALLOWED |
| Uni | 8 | 8 | abc | ALLOWED |
| Uni | 8 | 8 | dhn | ALLOWED |
| Uni | 8 | 8 | efgijkpqr | ALLOWED |
| Uni | 16 | 8 | integer | ALLOWED |
| Uni | 16 | 8 | abc | ALLOWED |
| Uni | 16 | 8 | dhn | ALLOWED |
| Uni | 16 | 8 | efgijkpqr | ALLOWED |
| Uni | 8 | 16 | integer | ALLOWED |
| Uni | 8 | 16 | abc | ALLOWED |
| Uni | 8 | 16 | dhn | ALLOWED |
| Uni | 8 | 16 | efgijkpqr | ALLOWED |
| Uni | 16 | 16 | integer | ALLOWED |
| Uni | 16 | 16 | abc | ALLOWED |
| Uni | 16 | 16 | dhn | ALLOWED |
| Uni | 16 | 16 | efgijkpqr | ALLOWED |

FIG. 12

| Bi/Uni | BH | BV | Sub pel | POSSIBILITY |
|---|---|---|---|---|
| Bi | 4 | 4 | integer | FORBIDDEN |
| Bi | 4 | 4 | abc | FORBIDDEN |
| Bi | 4 | 4 | dhn | FORBIDDEN |
| Bi | 4 | 4 | efgijkpqr | FORBIDDEN |
| Bi | 8 | 4 | integer | FORBIDDEN |
| Bi | 8 | 4 | abc | FORBIDDEN |
| Bi | 8 | 4 | dhn | FORBIDDEN |
| Bi | 8 | 4 | efgijkpqr | FORBIDDEN |
| Bi | 4 | 8 | integer | FORBIDDEN |
| Bi | 4 | 8 | abc | FORBIDDEN |
| Bi | 4 | 8 | dhn | FORBIDDEN |
| Bi | 4 | 8 | efgijkpqr | FORBIDDEN |
| Bi | 8 | 8 | integer | ALLOWED |
| Bi | 8 | 8 | abc | ALLOWED |
| Bi | 8 | 8 | dhn | FORBIDDEN |
| Bi | 8 | 8 | efgijkpqr | FORBIDDEN |
| Bi | 16 | 8 | integer | ALLOWED |
| Bi | 16 | 8 | abc | ALLOWED |
| Bi | 16 | 8 | dhn | ALLOWED |
| Bi | 16 | 8 | efgijkpqr | ALLOWED |
| Bi | 8 | 16 | integer | ALLOWED |
| Bi | 8 | 16 | abc | ALLOWED |
| Bi | 8 | 16 | dhn | ALLOWED |
| Bi | 8 | 16 | efgijkpqr | ALLOWED |
| Bi | 16 | 16 | integer | ALLOWED |
| Bi | 16 | 16 | abc | ALLOWED |
| Bi | 16 | 16 | dhn | ALLOWED |
| Bi | 16 | 16 | efgijkpqr | ALLOWED |
| Bi | 32 | 16 | integer | ALLOWED |
| Bi | 32 | 16 | abc | ALLOWED |
| Bi | 32 | 16 | dhn | ALLOWED |
| Bi | 32 | 16 | efgijkpqr | ALLOWED |
| Bi | 16 | 32 | integer | ALLOWED |
| Bi | 16 | 32 | abc | ALLOWED |
| Bi | 16 | 32 | dhn | ALLOWED |
| Bi | 16 | 32 | efgijkpqr | ALLOWED |
| Bi | 32 | 32 | integer | ALLOWED |
| Bi | 32 | 32 | abc | ALLOWED |
| Bi | 32 | 32 | dhn | ALLOWED |
| Bi | 32 | 32 | efgijkpqr | ALLOWED |

IMAGE PROCESSING APPARATUS AND METHOD

TECHNICAL FIELD

The present disclosure relates to an image processing apparatus and a method and relates to the image processing apparatus and the method which inhibit a decrease in coding efficiency.

BACKGROUND ART

Recently, an apparatus complying with a scheme such as MPEG (Moving Picture Experts Group) which digitally handles image information and compresses the same by orthogonal transform such as discrete cosine transform and motion compensation by using redundancy specific to the image information in order to transmit and accumulate the information with high efficiency is in widespread use in both information distribution in a broadcast station and information reception in standard home.

Especially, MPEG-2 (ISO (International Organization for Standardization)/IEC (International Electrotechnical Commission) 13818-2) defined as a general-purpose image coding scheme is a standard covering both an interlace scan image and a non-interlace scan image and both a standard-resolution image and a high-definition image and is currently widely used in a wide range of professional-use and consumer-use applications. By using MPEG-2, it is possible to realize a high compression ratio and excellent image quality by assigning a code amount (bit rate) of 4 to 8 Mbps and 18 to 22 Mbps for a standard-resolution interlace scan image having 720×480 pixels and a high-resolution interlace scan image having 1920×1088 pixels, respectively, for example.

A principal object of MPEG-2 is high image quality coding suitable for broadcasting, but this does not meet a coding scheme with a lower code amount (bit rate), that is, with a higher compression ratio than those of MPEG-1. Needs for such coding scheme is considered to grow in future with the spread of portable terminals, and MPEG-4 is standardized in reply to this. Regarding an image coding scheme, this standard is approved as an international standard as ISO/IEC 14496-2 in December 1998.

Further, recently, a standard referred to as H.26L (ITU-T (International Telecommunication Union Telecommunication Standardization Sector) Q6/16 VCEG (Video Coding Expert Group)) is being standardized with the target of the image coding initially for television conference. H.26L is known to realize higher coding efficiency though this requires more arithmetic operation amount for coding and decoding than that of a conventional coding scheme such as MPEG-2 and MPEG-4. Currently, standardization to realize the higher coding efficiency by introducing a function which is not supported by H.26L based on H.26L is performed as Joint Model of Enhanced-Compression Video Coding as a part of activities of MPEG-4.

As a schedule of standardization, this becomes the international standard under the name of H.264/MPEG-4 Part10 (Advanced Video Coding, hereinafter referred to as AVC) in March 2003.

Further, standardization of FRExt (Fidelity Range Extension) including a coding tool necessary for professional use such as RGB, 4:2:2, and 4:4:4 and also including 8×8 DCT and a quantization matrix defined in MPEG-2 is completed in February 2005 as an extension thereof, and according to this, this is used in a wide range of applications such as Blu-Ray Disc as the coding scheme capable of representing also a film noise included in a movie in an excellent manner by using AVC.

However, recently, needs for coding with a higher compression ratio such as to compress an UHD (Ultra High Definition; 4000 pixels×2000 pixels) image with pixels four times as many as those of a high-vision image or to distribute a high-vision image in an environment of a limited transmission capacity such as the Internet grow. Therefore, improvement in coding efficiency is continuously studied by VCEG (Video Coding Expert Group) under the umbrella of ITU-T described above.

In order to further improve the coding efficiency as compared to AVC, standardization of the coding scheme referred to as HEVC (High Efficiency Video Coding) by JCTVC (Joint Collaboration Team-Video Coding) being a common standardization organization of ITU-T and ISO/IEC is under way (for example, refer to Patent Document 1).

In such AVC and HEVC, a motion compensated filter (MC filter) is used such that motion compensation of fractional accuracy may be performed at the time of inter prediction (inter-frame prediction). As the MC filter, an 8-tap FIR (Finite Impulse Response) filter is used for a luminance component and a 4-tap FIR filter is used for a chrominance component in a case of HEVC, for example.

In the inter prediction, a coded image is taken out from a frame memory as a reference image based on a block size, a prediction mode, a motion vector (MV) and the like and the MC filter is applied based on a fractional part of the MV to generate an inter predicted image. Meanwhile, the MV is obtained by motion estimation in an encoder and from stream information in a decoder.

In a case of the MV of fractional accuracy, a tap count of the MC filter for generating the predicted image becomes larger. That is, the number of pixels of the reference image required for generating the predicted image becomes larger than in a case in which the MV is integer. Therefore, more pixel data should be read from the frame memory.

A pixel value of the reference image read for generating a certain pixel of the predicted image may also be used for generating another pixel around the pixel, so that usage efficiency of the reference image is higher as a size of the predicted image to be generated is larger, in general. That is, the number of pixels of the reference image required for generating the predicted image is smaller as the size of the predicted image is larger when being converted to the number per one pixel of the predicted image. In other words, the usage efficiency of the reference image becomes lower as the size of the predicted image is smaller and the number of pixels of the reference image required for generating one pixel of the predicted image becomes larger.

Further, in a case of bidirectional prediction, the number of reference images becomes larger than that in unidirectional prediction.

In this manner, when a size of the reference image to be read becomes larger, it becomes necessary to secure a larger memory bandwidth between a frame memory and an inter prediction unit in order to maintain a processing speed of coding and a load becomes larger.

Therefore, in AVC, it is possible to limit the resources used by a decoder according to a level. Specifically, there is an upper limit of the number of motion vectors which may be used in two consecutive macroblocks. The limitation prevents consecutive occurrences of the inter prediction of a small block size. The bidirectional prediction of a macroblock having a 8×8 block size is also forbidden.

CITATION LIST

Non-Patent Documents

Non-Patent Document 1: Benjamin Bross, Woo-Jin Han, Jens-Rainer Ohm, Gary J. Sullivan, Thomas Wiegand, "Working Draft 4 of High-Efficiency Video Coding", JCTVC-F803_d2, Joint Collaborative Team on Video Coding (JCT-VC) of ITU-T SG16 WP3 and ISO/IEC JTC1/SC29/WG11 6th Meeting: Torino, IT, 14-22 Jul. 2011

SUMMARY OF THE INVENTION

Problems to be Solved by the Invention

The above-described limitation is for inhibiting an excessive increase in load on the memory bandwidth, but such limitation decreases available prediction modes and block sizes, so that this decreases the coding efficiency.

However, conventionally, an effect on the load by the accuracy of the motion vector is not taken into consideration in such control. Therefore, the available prediction modes and block sizes are unnecessarily limited and the coding efficiency might be unnecessarily decreased.

The present disclosure is achieved in view of such a condition and an object thereof is to inhibit the unnecessary decrease in coding efficiency by limiting motion prediction in consideration of not only the block size and the prediction mode but also the accuracy of the motion vector.

Solution to Problems

One aspect of the present disclosure is an image processing apparatus including: a controller which controls candidates for an inter prediction mode in which motion compensation is performed based on accuracy of a motion vector; a motion search unit which performs a motion search only in inter prediction modes allowed by the controller to be the candidates to generate a motion vector; and a motion compensation unit which performs the motion compensation in the inter prediction mode selected from the candidates in each of which the motion vector is generated by the motion search unit to generate a predicted image.

The controller may control whether to make the inter prediction mode a candidate according to whether the accuracy of the motion vector is integral accuracy or fractional accuracy.

The controller may control whether to make the inter prediction mode the candidate according to whether the accuracy in vertical and horizontal directions of the motion vector is the integral accuracy or the fractional accuracy.

The controller may further control whether to make the inter prediction mode the candidate according to whether a prediction mode is uni-prediction or bi-prediction.

The controller may further control whether to make the inter prediction mode the candidate according to a size of an area being a prediction processing unit.

The controller may control whether to make the inter prediction mode the candidate according to whether information regarding a size of a data reading amount from a memory determined according to the accuracy of the motion vector exceeds an upper limit by resources and a user instruction.

A transmission unit which generates transmission information indicating a detail of control by the controller to be transmitted may further be provided.

The transmission unit may define a profile and a level as the transmission information and include information indicating the profile and the level in a sequence parameter set to be transmitted.

A cost function calculation unit which calculates a cost function value for each candidate in which the motion vector is generated by the motion search unit; and a mode selector which selects the inter prediction mode in which the motion compensation is performed from the candidates based on the cost function value calculated by the cost function calculation unit may further be provided, wherein the motion compensation unit may perform the motion compensation in the inter prediction mode selected by the mode selector.

One aspect of the present disclosure is an image processing method of an image processing apparatus, wherein a controller controls candidates for an inter prediction mode in which motion compensation is performed based on accuracy of a motion vector, a motion search unit performs a motion search only in inter prediction modes allowed to be the candidates to generate the motion vector, and a motion compensation unit performs the motion compensation in the inter prediction mode selected from the candidates in each of which the motion vector is generated to generate a predicted image.

Another aspect of the present disclosure is an image processing apparatus including: an obtaining unit which obtains control information to control a candidate for an inter prediction mode in which motion compensation is performed used in inter prediction when image data is coded based on accuracy of a motion vector; a determination unit which determines possibility of decoding of coded data generated by coding of the image data based on the control information obtained by the obtaining unit; and a controller which controls the decoding of the coded data based on a result of determination by the determination unit.

The determination unit may determine the possibility depending on whether information regarding a size of a data reading amount from a memory specified by the control information obtained by the obtaining unit exceeds an upper limit by resources and a user instruction.

The determination unit may determine the possibility depending on whether the information regarding the size of the data reading amount from the memory defined by a profile and a level exceeds the upper limit by the resources and the user instruction.

The controller may allow the decoding of the coded data to be executed only when the determination unit determines that the decoding is possible.

An error processor controlled by the controller to perform an error process when the determination unit determines that the decoding is not possible may further be provided.

Another aspect of the present disclosure is an image processing method of an image processing apparatus, wherein an obtaining unit obtains control information to control a candidate for an inter prediction mode in which motion compensation is performed used in inter prediction when image data is coded based on accuracy of a motion vector, a determination unit determines possibility of decoding of coded data generated by coding of the image data based on the obtained control information, and a controller controls the decoding of the coded data based on a determination result.

According to one aspect of the present disclosure, candidates for an inter prediction mode in which motion compensation is performed are controlled based on accuracy of a motion vector, a motion search is performed only in the inter prediction modes allowed to be the candidates and the motion vector is generated, and motion compensation is performed in the inter prediction mode selected from the candidates in each of which the motion vector is generated and a predicted image is generated.

According to another aspect of the present disclosure, control information to control a candidate for an inter prediction mode in which motion compensation is performed used in inter prediction when image data is coded based on accuracy of a motion vector is obtained, it is determined whether decoding of coded data generated by coding of image data is possible, and the decoding of the coded data is controlled by a determination result.

Effects of the Invention

According to the present disclosure, it is possible to process an image. Especially, it is possible to inhibit a decrease in coding efficiency.

BRIEF DESCRIPTION OF DRAWINGS

FIG. 2 is a view of an example of a motion prediction/compensation process of fractional accuracy.
FIG. 3 is a view illustrating a configuration example of a coding unit.
FIG. 4 is a view of relationship among a prediction mode, a block size, prediction accuracy, and the number of pixels of a reference image.
FIG. 5 is a view of the relationship among the prediction mode, the block size, the prediction accuracy, and the number of pixels of the reference image.
FIG. 6 is a block diagram of a principal configuration example of a motion prediction/compensation unit and a motion vector controller.
FIG. 11 is a view of an example of limitation information.
FIG. 12 is a view of another example of the limitation information.

MODE FOR CARRYING OUT THE INVENTION

Modes for carrying out the present disclosure (hereinafter, referred to as an embodiments) are hereinafter described. Note that the description is given in the following order.
1. First Embodiment (Image Coding Apparatus)
2. Second Embodiment (Image Decoding Apparatus)
3. Third Embodiment (Computer)
4. Fourth Embodiment (Television Receiver)
5. Fifth Embodiment (Mobile Phone)
6. Sixth Embodiment (Recording/Reproducing Apparatus)
7. Seventh Embodiment (Imaging Apparatus)

1. First Embodiment

[Image Coding Apparatus]

Figure 1:
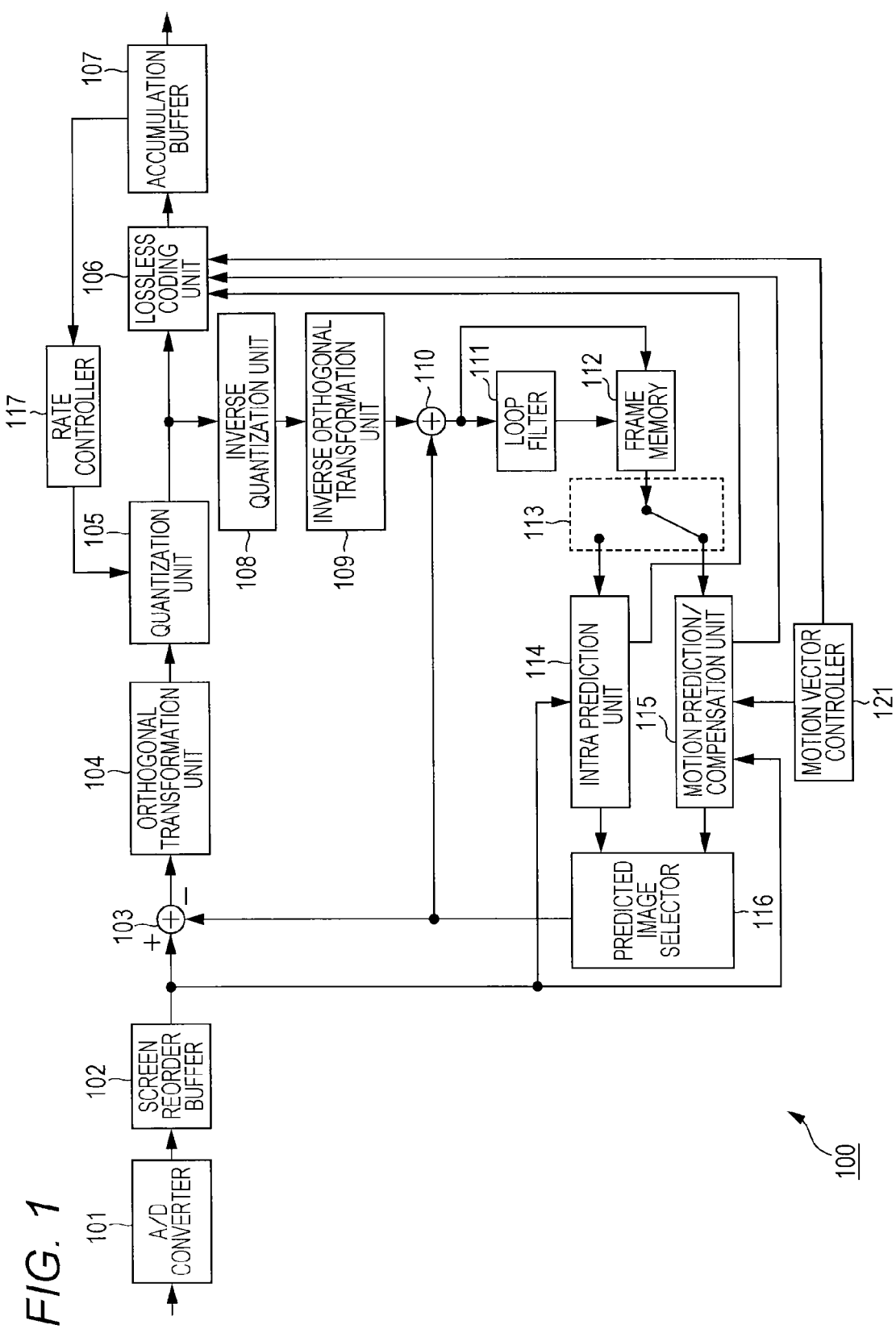
FIG. 1 is a block diagram of a principal configuration example of an image coding apparatus.

FIG. 1 is a block diagram of a principal configuration example of an image coding apparatus being an image processing apparatus to which this technology is applied.

An image coding apparatus 100 illustrated in FIG. 1 codes image data of a moving image by using HEVC (High Efficiency Video Coding) and H.264/MPEG (Moving Picture Experts Group)-4 Part 10 (AVC (Advanced Video Coding)), for example.

As illustrated in FIG. 1, the image coding apparatus 100 includes an A/D converter 101, a screen reorder buffer 102, an arithmetic unit 103, an orthogonal transformation unit 104, a quantization unit 105, a lossless coding unit 106, and an accumulation buffer 107. The image coding apparatus 100 also includes an inverse quantization unit 108, an inverse orthogonal transformation unit 109, an arithmetic unit 110, a loop filter 111, a frame memory 112, a selector 113, an intra prediction unit 114, a motion prediction/compensation unit 115, a predicted image selector 116, and a rate controller 117.

The image coding apparatus 100 further includes a motion vector controller 121.

The A/D converter 101 A/D converts input image data, supplies converted image data (digital data) to the screen reorder buffer 102 to be stored.

The screen reorder buffer 102 reorders images of frames in stored order of display into order of frames for coding according to GOP (Group Of Pictures) and supplies the image in which the order of frames is reordered to the arithmetic unit 103. The screen reorder buffer 102 supplies each frame image to the arithmetic unit 103 for each predetermined partial area being a processing unit of a coding process (coding unit). The screen reorder buffer 102 supplies the image in which the order of frames is reordered also to the intra prediction unit 114 and the motion prediction/compensation unit 115 for each partial area in a similar manner.

The arithmetic unit 103 subtracts, from the image read from the screen reorder buffer 102, a predicted image supplied from the intra prediction unit 114 or the motion prediction/compensation unit 115 through the predicted image selector 116 and outputs difference information to the orthogonal transformation unit 104. For example, in a case of the image to which intra coding is performed, the arithmetic unit 103 subtracts, from the image read from the screen reorder buffer 102, the predicted image supplied from the intra prediction unit 114. Also, in a case of the image to which inter coding is performed, for example, the arithmetic unit 103 subtracts, from the image read from the screen reorder buffer 102, the predicted image supplied from the motion prediction/compensation unit 115.

The orthogonal transformation unit 104 performs an orthogonal transform such as discrete cosign transform and the Karhunen-Loeve transform to the difference information supplied from the arithmetic unit 103. Meanwhile, the orthogonal transform may be performed by an arbitrary method. The orthogonal transformation unit 104 supplies a transform coefficient obtained by the orthogonal transform to the quantization unit 105.

The quantization unit 105 quantizes the transform coefficient supplied from the orthogonal transformation unit 104. The quantization unit 105 supplies the quantized transform coefficient to the lossless coding unit 106.

The lossless coding unit 106 codes the transform coefficient quantized by the quantization unit 105 by using an arbitrary coding scheme to generate coded data (bit stream). Coefficient data is quantized under control of the rate controller 117, so that a code amount of the coded data reaches a target value set by the rate controller 117 (or approximated to the target value).

The lossless coding unit 106 also obtains intra prediction information including information indicating a mode of intra prediction and the like from the intra prediction unit 114 and obtains inter prediction information including information indicating a mode of inter prediction, motion vector information and the like from the motion prediction/compensation unit 115.

Further, the lossless coding unit 106 obtains information regarding limitation of motion prediction (transmission information) supplied from the motion vector controller 121.

The lossless coding unit 106 codes the various pieces of information by using an arbitrary coding scheme to add to (multiplex with) the coded data (bit stream).

The lossless coding unit 106 supplies the coded data generated in this manner to the accumulation buffer 107 to be accumulated. The coding scheme of the lossless coding unit 106 includes variable-length coding, arithmetic coding or the like, for example. The variable-length coding includes, for example, CAVLC (Context-Adaptive Variable Length Coding) defined in H.264/AVC and the like. The arithmetic coding includes, for example, CABAC (Context-Adaptive Binary Arithmetic Coding) and the like.

The accumulation buffer 107 temporarily holds the coded data supplied from the lossless coding unit 106. The accumulation buffer 107 outputs the held coded data to a recording apparatus (recording medium) and a transmission path not illustrated of a subsequent stage, for example, as the bit stream at a predetermined timing. That is to say, the coded various pieces of information are supplied to an apparatus which decodes the coded data obtained by coding of the image data by the image coding apparatus 100 (hereinafter, also referred to as an apparatus on a decoding side).

The transform coefficient quantized by the quantization unit 105 is also supplied to the inverse quantization unit 108. The inverse quantization unit 108 inversely quantizes the quantized transform coefficient by a method corresponding to the quantization by the quantization unit 105. The inverse quantization unit 108 supplies an obtained transform coefficient to the inverse orthogonal transformation unit 109.

The inverse orthogonal transformation unit 109 inversely orthogonally transforms the transform coefficient supplied from the inverse quantization unit 108 by a method corresponding to the orthogonal transform by the orthogonal transformation unit 104. An inversely orthogonally transformed output (locally restored difference information) is supplied to the arithmetic unit 110.

The arithmetic unit 110 adds the predicted image supplied from the intra prediction unit 114 or the motion prediction/compensation unit 115 through the predicted image selector 116 to a result of the inverse orthogonal transform, that is to say, the locally restored difference information, supplied from the inverse orthogonal transformation unit 109 to obtain a locally reconstructed image (hereinafter, referred to as a reconstructed image). The reconstructed image is supplied to the loop filter 111 or the frame memory 112.

The loop filter 111 including a deblocking filter, an adaptive loop filter and the like appropriately performs a filter process to the decoded image supplied from the arithmetic unit 110. For example, the loop filter 111 removes block distortion of the decoded image by performing the deblocking filter process to the decoded image. For example, the loop filter 111 improves image quality by performing a loop filter process to a result of the deblocking filter process (the decoded image from which the block distortion is removed) by using a Wiener filter.

Meanwhile, it is also possible that the loop filter 111 performs an arbitrary filter process to the decoded image. The loop filter 111 may also supply information such as a filter coefficient used in the filter process to the lossless coding unit 106 to be coded as needed. The loop filter 111 supplies a result of the filter process (hereinafter, referred to as a decoded image) to the frame memory 112.

The frame memory 112 stores the reconstructed image supplied from the arithmetic unit 110 and the decoded image supplied from the loop filter 111. The frame memory 112 supplies the stored reconstructed image through the selector 113 to the intra prediction unit 114 at a predetermined timing or upon external request from the intra prediction unit 114 and the like. The frame memory 112 also supplies the stored decoded image through the selector 113 to the motion prediction/compensation unit 115 at a predetermined timing or upon external request from the motion prediction/compensation unit 115 and the like.

The selector 113 indicates a destination to which the image output from the frame memory 112 is supplied. For example, in a case of the intra prediction, the selector 113 reads the image to which the filter process is not performed (reconstructed image) from the frame memory 112 and supplies the same to the intra prediction unit 114 as a peripheral pixel.

For example, in a case of the inter prediction, the selector 113 reads the image to which the filter process is performed (decoded image) from the frame memory 112 and supplies the same to the motion prediction/compensation unit 115 as a reference image.

When the intra prediction unit 114 obtains an image (peripheral image) of a peripheral area located around a current area from the frame memory 112, this performs the intra prediction (in-screen prediction) to generate the predicted image basically by making a prediction unit (PU) a processing unit by using a pixel value of the peripheral image. The intra prediction unit 114 performs the intra prediction in a plurality of modes (intra prediction modes) prepared in advance.

The intra prediction unit 114 generates the predicted images in all of the intra prediction modes being candidates and evaluates a cost function value of each predicted image by using an input image supplied from the screen reorder buffer 102 to select an optimal mode. When the intra prediction unit 114 selects the optimal intra prediction mode, this supplies the predicted image generated in the optimal mode to the predicted image selector 116.

The intra prediction unit 114 appropriately supplies the intra prediction information including information regarding the intra prediction such as the optimal intra prediction mode to the lossless coding unit 106 to be coded.

The motion prediction/compensation unit 115 performs the motion prediction (inter prediction) basically by making the PU the processing unit by using the input image supplied from the screen reorder buffer 102 and the reference image supplied from the frame memory 112 and performs a motion compensation process according to a detected motion vector to generate the predicted image (inter predicted image information). The motion prediction/compensation unit 115 performs such inter prediction in a plurality of modes (inter prediction modes) prepared in advance.

Meanwhile, the motion prediction/compensation unit 115 performs the motion prediction only in allowed modes according to control of the motion vector controller 121. That is, the inter prediction modes being candidates might be limited by the motion vector controller 121.

The motion prediction/compensation unit 115 generates the predicted images in all of the inter prediction modes being the candidates and evaluates the cost function value of each predicted image to select an optimal mode. When the motion prediction/compensation unit 115 selects the optimal inter prediction mode, this supplies the predicted image generated in the optimal mode to the predicted image selector 116.

The motion prediction/compensation unit 115 appropriately supplies the inter prediction information including information regarding the inter prediction such as the optimal inter prediction mode to the lossless coding unit 106 to be coded.

The predicted image selector 116 selects a source from which the predicted image to be supplied to the arithmetic unit 103 and the arithmetic unit 110 is supplied. For example, in a case of the intra coding, the predicted image selector 116 selects the intra prediction unit 114 as the source from which the predicted image is supplied and supplies the predicted image supplied from the intra prediction unit 114 to the arithmetic unit 103 and the arithmetic unit 110. For example, in a case of the inter coding, the predicted image selector 116 selects the motion prediction/compensation unit 115 as the source from which the predicted image is supplied and supplies the predicted image supplied from the motion prediction/compensation unit 115 to the arithmetic unit 103 and the arithmetic unit 110.

The rate controller 117 controls a rate of a quantization operation by the quantization unit 105 such that an overflow or an underflow does not occur based on the code amount of the coded data accumulated in the accumulation buffer 107.

The motion vector controller 121 controls the mode of the motion prediction by the motion prediction/compensation unit 115 for securing resources about reading of the reference image by the motion prediction/compensation unit 115. That is, the motion vector controller 121 appropriately limits generation of the motion vector such that a memory bandwidth of the frame memory 112 is not unnecessarily occupied for reading the reference image. At that time, the motion vector controller 121 limits in consideration of not only a block size and a prediction mode (prediction direction) but also accuracy of the generated motion vector.

The motion vector controller 121 supplies control information indicating such a limitation detail to the motion prediction/compensation unit 115. The motion prediction/compensation unit 115 performs the motion prediction according to the supplied control information. According to this, the motion prediction/compensation unit 115 performs the motion prediction according to the limitation in which the accuracy of the motion vector is also taken into consideration.

Meanwhile, the motion vector controller 121 supplies the information regarding the limitation to the lossless coding unit 106 as the transmission information to be transmitted.

[Quarter Pixel Accuracy Motion Prediction]

FIG. 2 is a view illustrating an example of a state of a quarter pixel accuracy motion prediction/compensation process defined in AVC. In FIG. 2, each square represents a pixel. Among them, A indicates a position of an integral accuracy pixel stored in the frame memory, b, c, and d indicate positions of half pixel accuracy, and $e_1$, $e_2$, and $e_3$ indicate positions of quarter pixel accuracy.

Hereinafter, a function Clip1( ) is defined by following equation (1).

$$\text{Clip1}(a)= \begin{array}{l} 0; \text{ if } (a<0) \\ a; \text{ otherwise} \\ \max\_pix; \text{ if}(a>\max\_pix) \end{array} \quad (1)$$

For example, when the input image is of 8-bit accuracy, a value of max_pix in equation (1) is 255.

Pixel values in positions b and d are generated by following equations (2) and (3) by using a 6-tap FIR filter.

$$F = A_{-2} - 5 \cdot A_{-1} + 20 \cdot A_0 + 20 \cdot A_1 - 5 \cdot A_2 + A_3 \quad (2)$$

$$b,d = \text{Clip1}((F+16) >> 5) \quad (3)$$

A pixel value in a position c is generated by following equations (4) to (6) by applying the 6-tap FIR filter in a horizontal direction and a vertical direction.

$$F = b_{-2} - 5 \cdot b_{-1} + 20 \cdot b_0 + 20 \cdot b_1 - 5 \cdot b_2 + b_3 \quad (4)$$

or $$F = d_{-2} - 5 \cdot d_{-1} + 20 \cdot d_0 + 20 \cdot d_1 - 5 \cdot d_2 + d_3 \quad (5)$$

$$c = \text{Clip1}((F+512) >> 10) \quad (6)$$

Meanwhile, a Clip process is performed only once at last after a product-sum process in the horizontal direction and that in the vertical direction are performed.

As in following equations (7) to (9), $e_1$ to $e_3$ are generated by linear interpolation.

$$e_1 = (A+b+1) >> 1 \quad (7)$$

$$e_2 = (b+d+1) >> 1 \quad (8)$$

$$e_3 = (b+c+1) >> 1 \quad (9)$$

When the motion vector is of fractional accuracy in this manner, the reference image including more pixels is required as compared to a case where the motion vector is of integral accuracy for generating the predicted image.

[Coding Unit]

A coding unit (CU) defined in HEVC is herein described.

The coding unit (CU) also referred to as a coding tree block (CTB) is a partial area having a multilayer structure of the image in a picture unit playing a role similar to that of a macroblock in AVC. That is, the CU is a unit of the coding process (coding unit). While a size of the macroblock is fixed to 16×16 pixels, a size of the CU is not fixed and this is specified in image compression information in each sequence.

Especially, the CU having a largest size is referred to as a largest coding unit (LCU) and the CU having a smallest size is referred to as a smallest coding unit (SCU). That is, the LCU is a maximum coding unit and the SCU is a minimum coding unit. For example, while sizes of the areas are specified in a sequence parameter set included in the image compression information, they are limited to squares having sizes represented by a power of two. That is, each area obtained by splitting the (square) CU in a certain layer into four parts (2×2) becomes the (square) CU in a next layer down.

FIG. 3 is an example of the coding unit defined in HEVC. In an example in FIG. 3, the size of the LCU is 128 (2N (N=64)) and a maximum hierarchical depth is 5 (Depth=4). The CU having a size of 2N×2N is split into the CUs having a size of N×N in a next layer down when a value of split_flag is set to 1.

Further, the CU is split into prediction units (PUs) each of which is an area being a processing unit of the intra prediction or the inter prediction (partial area of the image in a picture unit) and split into transform units (TUs) each of which is an area being a processing unit of the orthogonal transform (partial area of the image in a picture unit).

In a case of the PU of the inter prediction (Inter Prediction Unit), four sizes of 2N×2N, 2N×N, N×2N, and N×N may be set for the CU having the size of 2N×2N. That is, for one CU, it is possible to define one PU having the same size as the CU, two PUs obtained by vertically or horizontally splitting the CU into two pieces, or four PUs obtained by vertically and horizontally splitting the CU into two pieces.

The image coding apparatus 100 performs each process regarding the coding by making such partial area of the image in a picture unit the processing unit. Hereinafter, a case where the image coding apparatus 100 makes the CU defined in HEVC the coding unit is described. That is, the LCU is the maximum coding unit and the SCU is the minimum coding unit. However, the processing unit of each process of the coding by the image coding apparatus 100 is not limited to thereto but arbitrary. For example, it is also possible to make the macroblock and a sub macroblock defined in AVC the processing unit.

Meanwhile, hereinafter, "(partial) area" includes all of (or any of) the above-described various areas (for example, the macroblock, sub macroblock, LCU, CU, SCU, PU, TU and the like). It goes without saying that the unit other than the above-described units may be included and an impossible unit according to the description is appropriately excluded.

[Limitation of Number of Pixels of Reference Image]

As described above, the PU being the processing unit of the motion prediction (motion vector generation) may be set to have various sizes. In general, as the size of the PU is smaller, usage efficiency of the reference image becomes lower and the number of pixels of the reference image required for generating one pixel of the predicted image becomes larger. In a case of bidirectional prediction, the number of reference images increases as compared to a case of unidirectional prediction.

Therefore, in AVC, it is possible to limit the resources used by a decoder according to a level. Specifically, there is an upper limit of the number of motion vectors which may be used in two consecutive macroblocks. The limitation prevents consecutive occurrences of the inter prediction of a small block size.

The bidirectional prediction of the macroblock having the block size smaller than 8×8 is also forbidden.

Such limitation decreases coding efficiency due to a small number of available prediction modes and block sizes, but this is necessary for inhibiting an excessive increase in load to the memory bandwidth.

[Required Number of Pixels of Reference Image]

The number of pixels of the reference image required for generating the predicted image is herein more specifically described. It is necessary to input (n+tap count−1) pixels for an MC filter to output n pixels. That is, the number of pixels N of the reference image required for generating the predicted image may be represented by following equation (10) when the size of the PU in the vertical direction is set BV and the size in the horizontal direction is set BH.

$$N=(BH+\text{tap count}-1)\times(BV+\text{tap count}-1) \quad (10)$$

A case where the motion vector is an integer (fraction part thereof is 0) corresponds to a case where a 1-tap FIR filter is used. That is, in equation (10), the tap count=1. In a case of bi-prediction, both of L0 prediction and L1 prediction are required, so that the number of pixels N of the reference image required for generating the predicted image may be represented by following equation (11).

$$N=\text{(pixels corresponding to equation (10) of } L0)+ \\ \text{(pixels corresponding to equation (10) of } L1) \quad (11)$$

Further, access to an actual memory in one pixel unit cannot be performed and reading in a memory alignment unit is required. When the number of pixels of memory alignments in the horizontal direction and the vertical direction are AH and AV, respectively, the number of pixels N of the reference image required for generating the predicted image may be represented by following equation (12).

$$N=AH\times(1+\text{ROUNDUP}(((BH+\text{tap count}-1)-1)/AH)))\times AV\times(1+\text{ROUNDUP}(((BV+\text{tap count}-1)-1)/AV))) \quad (12)$$

Meanwhile, in equation (12), ROUNDUP(x) represents a minimum integer larger than x. In a case of the bi-prediction, the number of pixels N of the reference image required for generating the predicted image may be represented by following equation (13).

$$N=\text{(pixels corresponding to equation (12) of } L0)+ \\ \text{(pixels corresponding to equation (12) of } L1) \quad (13)$$

Therefore, in a case of uni-prediction, when the number of pixels of the reference image required for generating the predicted image is converted to that per one pixel of the predicted image, the number of pixels N may be represented by following equation (14) and in a case of the bi-prediction, the number of pixels N may be represented in following equation (15).

$$N=\text{(number of pixels corresponding to equation (12)}/ \\ (BH\times BV) \quad (14)$$

$$N=\text{(number of pixels corresponding to equation (13)}/ \\ (BH\times BV) \quad (15)$$

As described above, the number of pixels per one pixel of the predicted image of the reference image required for generating the predicted image depends not only on the block size and the prediction mode (uni-prediction or bi-prediction) but also on the tap count, that is, whether the accuracy of the generated motion vector is the integral accuracy or the fractional accuracy.

Relationship among the prediction mode, the PU size, the motion vector accuracy, and the number of pixels per one pixel of the predicted image of the reference image required for generating the predicted image when the number of pixels of the memory alignment in the horizontal direction AH is set to eight and the number of pixels of the memory alignment in the vertical direction AV is set to two is indicated in tables in FIGS. 4 and 5. FIG. 4 is the relationship among the PU size, the motion vector accuracy, and the number of pixels per one pixel of the predicted image of the reference image required for generating the predicted image when the prediction mode is the uni-prediction (Uni) and FIG. 5 is the relationship among the PU size, the motion vector accuracy, and the number of pixels per one pixel of the predicted image of the reference image required for generating the predicted image when the prediction mode is the bi-prediction (Bi).

In the tables illustrated in FIGS. 4 and 5, a value in a "Bi/Uni" column indicates the prediction mode (uni-prediction (Uni) or bi-prediction (Bi)).

A number in a "BH" column indicates the size of the PU in the horizontal direction and a number in a "BV" column indicates the size of the PU in the vertical direction.

A value in a "Sub pel" column indicates the accuracy of the motion vector. "integer" indicates that the motion vector is of integral accuracy in both of the vertical direction and horizontal direction. "abc" indicates that the motion vector is of integral accuracy in the vertical direction and of fractional accuracy in the horizontal direction. "dhn" indicates that the motion vector is of fractional accuracy in the vertical direction and of integral accuracy in the horizontal direction. "efgijkpqr" indicates that the motion vector is of fractional accuracy in both of the vertical direction and horizontal direction.

A number in a "number of input pixels" column indicates the number of pixels per one pixel of the predicted image of the reference image required for generating the predicted image. That is, this indicates a size of a data amount read from the frame memory. Meanwhile, in a case of AVC, a maximum value of the number of input pixels is "13.5" (limited to "13.5"). A shaded part in FIGS. 4 and 5 indicates examples in which the value of the "number of input pixels" is larger than "13.5" (larger than limitation of AVC).

In a conventional case such as AVC, it is limited only by the prediction mode and the block size, so that all the bi-predictions of the block size smaller than 8×8 and an 8×8 block size are forbidden.

However, as illustrated in FIGS. 4 and 5, there is a case where the number of pixels per one pixel of the predicted image of the reference image required for generating the predicted image is lower than an upper limit of AVC even when the block size is smaller than 8×8. That is, since an effect of the accuracy of the motion vector on the load is not taken into consideration, options of the inter prediction mode is unnecessarily limited and the coding efficiency might decrease consequently.

Therefore, the motion vector controller 121 limits the motion prediction in consideration not only of the block size and the prediction mode but also of the accuracy of the motion vector in order to inhibit an unnecessary decrease in coding efficiency as much as possible.

[Motion Prediction/Compensation Unit, Motion Vector Controller]

FIG. 6 is a block diagram of a principal configuration example of the motion prediction/compensation unit 115 and the motion vector controller 121 in FIG. 1.

As illustrated in FIG. 6, the motion prediction/compensation unit 115 includes a motion search unit 151, a cost function calculation unit 152, a mode determination unit 153, a motion compensation unit 154, and a motion information buffer 155.

The motion vector controller 121 includes a limitation information storage unit 161, a limitation controller 162, and a transmission information providing unit 163.

The motion search unit 151 of the motion prediction/compensation unit 115 performs a motion search for each area of the prediction processing unit in all of the inter prediction modes being the candidates by using an input image pixel value obtained from the screen reorder buffer 102 and a reference image pixel value obtained from the frame memory 112 to obtain the motion vector and further obtains a difference image (difference pixel value) between the input image and the reference image.

At that time, the motion search unit 151 obtains motion vector control information supplied from the limitation controller 162 of the motion vector controller 121 and performs the motion search according to limitation indicated by the motion vector control information. That is, the motion search unit 151 makes only the modes allowed by the limitation controller 162 the inter prediction modes being the candidates and performs the motion search only for the modes. In other words, the motion search unit 151 does not perform the motion search in the mode forbidden by the limitation controller 162.

The motion search unit 151 also appropriately obtains peripheral motion information being information regarding the motion vector of a peripheral PU located around a PU of interest being a current PU from the motion information buffer 155 to perform a process of a median prediction, a merge mode and the like.

The motion search unit 151 supplies information regarding motion (motion information) in each inter prediction mode obtained in the above-described manner to the cost function calculation unit 152. Meanwhile, the motion search unit 151 also supplies the difference pixel value corresponding to the motion information to the cost function calculation unit 152 as needed.

The cost function calculation unit 152 calculates the cost function value for all of the inter prediction modes based on the information supplied from the motion search unit 151. The cost function calculation unit 152 supplies the calculated cost function value of each inter prediction mode to the mode determination unit 153 together with the motion information.

The mode determination unit 153 determines the inter prediction mode with a smallest cost function value as the optimal inter prediction mode. The mode determination unit 153 supplies optimal prediction mode information indicating the optimal inter prediction mode to the motion compensation unit 154 together with the motion information in the optimal inter prediction mode.

The motion compensation unit 154 performs the motion compensation in the optimal inter prediction mode to generate the predicted image. The motion compensation unit 154 obtains the reference image pixel value corresponding to the motion information from the frame memory 112 in the optimal inter prediction mode according to the motion information and the optimal prediction mode information obtained from the mode determination unit 153. Meanwhile, when the optimal inter prediction mode is the mode in which the motion vector is not supplied from the mode determination unit 153 such as an MV competition mode and the merge mode, the motion compensation unit 154 obtains the motion information of the peripheral PU (peripheral motion information) from the motion information buffer 155.

As described above, in the motion search unit 151, only the prediction modes allowed by the limitation controller 162 are made the inter prediction modes being the candidates and the motion search is performed only for the modes. Therefore, the mode which is made the optimal inter prediction mode also is one of the modes allowed by the limitation controller 162. That is to say, the motion compensation unit 154 performs the motion compensation in the inter prediction modes allowed by the limitation controller 162.

The motion compensation unit 154 also supplies the generated predicted image pixel value to the predicted image selector 116 and allows the arithmetic unit 103 to subtract the same from the input image or allows the arithmetic unit 110 to add the same to the difference image.

The motion compensation unit 154 supplies the optimal prediction mode information and the motion information to the lossless coding unit 106 to be coded. Further, the motion compensation unit 154 supplies the motion information to the motion information buffer 155 to be stored.

The motion information buffer 155 obtains the motion information supplied from the motion compensation unit 154 to store. The motion information buffer 155 supplies the stored motion information to the motion search unit 151 and the motion compensation unit 154 as the peripheral motion information.

The limitation information storage unit 161 of the motion vector controller 121 stores limitation information being information regarding the limitation of the inter prediction mode in advance and supplies the limitation information to the limitation controller 162 at a predetermined timing or upon request from another processor such as the limitation controller 162, for example.

The limitation information is information which allows the motion vector control information to include at least the limitation by the accuracy of the motion vector (limitation by the "Sub pel" column in FIGS. 4 and 5) such as "4×4 block size is forbidden in the L0 prediction or the L1 prediction, 4×4, 8×4, 4×8, and 8×8 "efgijkpqr" are forbidden in the bi-prediction", for example. In other words, any information is available as the limitation information as long as this may provide such limitation. The mode (combination of the prediction mode (uni-prediction and bi-prediction), the block size, and the accuracy of the motion vector) specifically limited is arbitrary. That is, in a case of the example in FIGS. 4 and 5, any row in the table might be forbidden.

When the limitation controller 162 obtains the limitation information from the limitation information storage unit 161, this generates the motion vector control information to notify the motion search unit 151 of the limitation detail according to the limitation information and supplies the generated motion vector control information to the motion search unit 151. The motion search unit 151 may perform the motion search only in the modes allowed by the limitation information by performing the motion search according to the limitation of the motion vector control information.

In this manner, the motion compensation unit 154 may also perform the motion compensation in the modes allowed by the limitation information. That is to say, the motion vector controller 121 (limitation controller 162) may limit the motion prediction by the accuracy of the motion vector. Therefore, the motion vector controller 121 (limitation controller 162) may inhibit the increase in load while inhibiting the decrease in coding efficiency to code the image. Therefore, the image coding apparatus 100 may lower inhibition of coding efficiency.

The limitation controller 162 supplies the control information instructing to transmit the information indicating the limitation detail to the transmission information providing unit 163. The control information also includes the limitation detail by the limitation information. The transmission information providing unit 163 generates the transmission information indicating the limitation detail by the limitation information according to the supplied control information and supplies the transmission information to the lossless coding unit 106 to be transmitted.

Any information is available as the transmission information as long as this is the information indicating the limitation detail of the limitation information. For example, the limitation information may be included in the transmission information, the limitation detail may be included in the transmission information, or information equivalent to the limitation detail may be included in the transmission information.

As described above, any limitation is available as the limitation by the motion vector control information as long as this includes the limitation by the accuracy of the motion vector. For example, it is possible that, when the upper limit of the "number of input pixels" is set comparable to that of AVC (13.5) in the tables in FIGS. 4 and 5, "abc", "dhn", and "efgijkpqr" of the 4×4 block size and "efgijkpqr" of the 8×8 block size are forbidden and those other than them are allowed in the uni-prediction, and all of the Sub pels of the block sizes of 4×4, 8×4, and 4×8 and "dhn" and "efgijkpqr" of the 8×8 block size are forbidden and those other than them are allowed in the bi-prediction.

By such limitation, the mode conventionally forbidden in the method of limiting only by the block size and the prediction mode (for example, "integer" of the 4×4 block size and "integer", "abc", and "dhn" of the 8×4 block size and 4×8 block size in the uni-prediction, and "integer" and "abc" of the 8×8 block size in the bi-prediction is allowed. Therefore, the image coding apparatus 100 may inhibit unnecessary decrease in the number of candidates for the prediction mode, so that this may lower the inhibition of the coding efficiency.

Meanwhile, the limitation other than the limitation by the accuracy of the motion vector is arbitrary, the limitation other than the prediction mode and the block size may be included or the limitation by the prediction mode and the block size may be omitted in the limitation by the motion vector control information. The transmission information may include the limitation detail by the motion vector control information.

Further, any information is available as the limitation information as long as the limitation by the accuracy of the motion vector is included in the motion vector control information and the transmission information.

[Flow of Coding Process]

Next, a flow of each process executed by the above-described image coding apparatus 100 is described. First, an example of a flow of a coding process is described with reference to a flowchart in FIG. 7.

At step S101, the A/D converter 101 A/D converts the input image. At step S102, the screen reorder buffer 102 stores the A/D converted image and reorders pictures in order of display into order for coding.

At step S103, the intra prediction unit 114 performs an intra prediction process in the intra prediction mode.

At step S104, the motion vector controller 121 performs a motion vector control process to limit the motion vector generation of the motion prediction/compensation process.

At step S105, the motion prediction/compensation unit 115 performs an inter motion prediction process to perform the motion prediction and the motion compensation in the inter prediction mode according to the limitation of the motion vector at step S104.

At step S106, the predicted image selector 116 determines the optimal prediction mode based on each cost function value output from the intra prediction unit 114 and the motion prediction/compensation unit 115. That is, the predicted image selector 116 selects any one of the predicted image generated by the intra prediction unit 114 and the predicted image generated by the motion prediction/compensation unit 115.

At step S107, the arithmetic unit 103 performs an arithmetic operation of the difference between the image reordered by the process at step S102 and the predicted image selected by the process at step S106. A data amount of difference data is smaller than that of original image data. Therefore, it is possible to compress the data amount as compared to a case where the image is directly coded.

At step S108, the orthogonal transformation unit 104 orthogonally transforms the difference information generated by the process at step S107. Specifically, the orthogonal transform such as the discrete cosine transform and the Karhunen-Loeve transform is performed and the transform coefficient is output.

At step S109, the quantization unit 105 quantizes the orthogonal transform coefficient obtained by the process at step S108.

The difference information quantized by the process at step S108 is locally decoded in a following manner. That is, at step S110, the inverse quantization unit 108 inversely quantizes the orthogonal transform coefficient quantized by the process at step S109 by the method corresponding to the quantization at step S109. At step S111, the inverse orthogonal transformation unit 109 inversely orthogonally transforms the orthogonal transform coefficient obtained by the process at step S110 by the method corresponding to the process at step S108.

At step S112, the arithmetic unit 110 adds the predicted image to the locally decoded difference information to generate the locally decoded image (image corresponding to an input to the arithmetic unit 103). At step S113, the loop filter 111 performs the loop filter process to the image generated by the process at step S112. According to this, the block distortion and the like is removed and the image quality is improved.

At step S114, the frame memory 112 stores the image from which the block distortion is removed by the process at step S113. Meanwhile, the image to which the filter process is not performed is also stored in the frame memory 112. The image stored in the frame memory 112 is used in the process at step S103 and the process at step S105.

At step S115, the lossless coding unit 106 codes the transform coefficient quantized by the process at step S109 to generate the coded data. That is, the lossless coding such as the variable-length coding and the arithmetic coding is performed to a difference image (secondary difference image in a case of inter).

Meanwhile, the lossless coding unit 106 codes information regarding the prediction mode of the predicted image selected by the process at step S106 and adds the same to the coded data obtained by coding the difference image. For example, when the intra prediction mode is selected, the lossless coding unit 106 codes intra prediction mode information. For example, when the inter prediction mode is selected, the lossless coding unit 106 codes inter prediction mode information. The information is added to (multiplexed with) the coded data as header information and the like, for example.

At step S116, the accumulation buffer 107 accumulates the coded data generated by the process at step S115. The coded data accumulated in the accumulation buffer 107 is appropriately read to be transmitted to the apparatus on the decoding side through an arbitrary transmission path (including not only a communication path but also a storage medium and the like).

At step S117, the rate controller 117 controls the rate of the quantization operation of the quantization unit 105 such that the overflow or the underflow does not occur based on the compressed image accumulated in the accumulation buffer 107 by the process at step S116.

When the process at step S117 is finished, the coding process is finished.

[Flow of Motion Vector Control Process]

Figure 7:
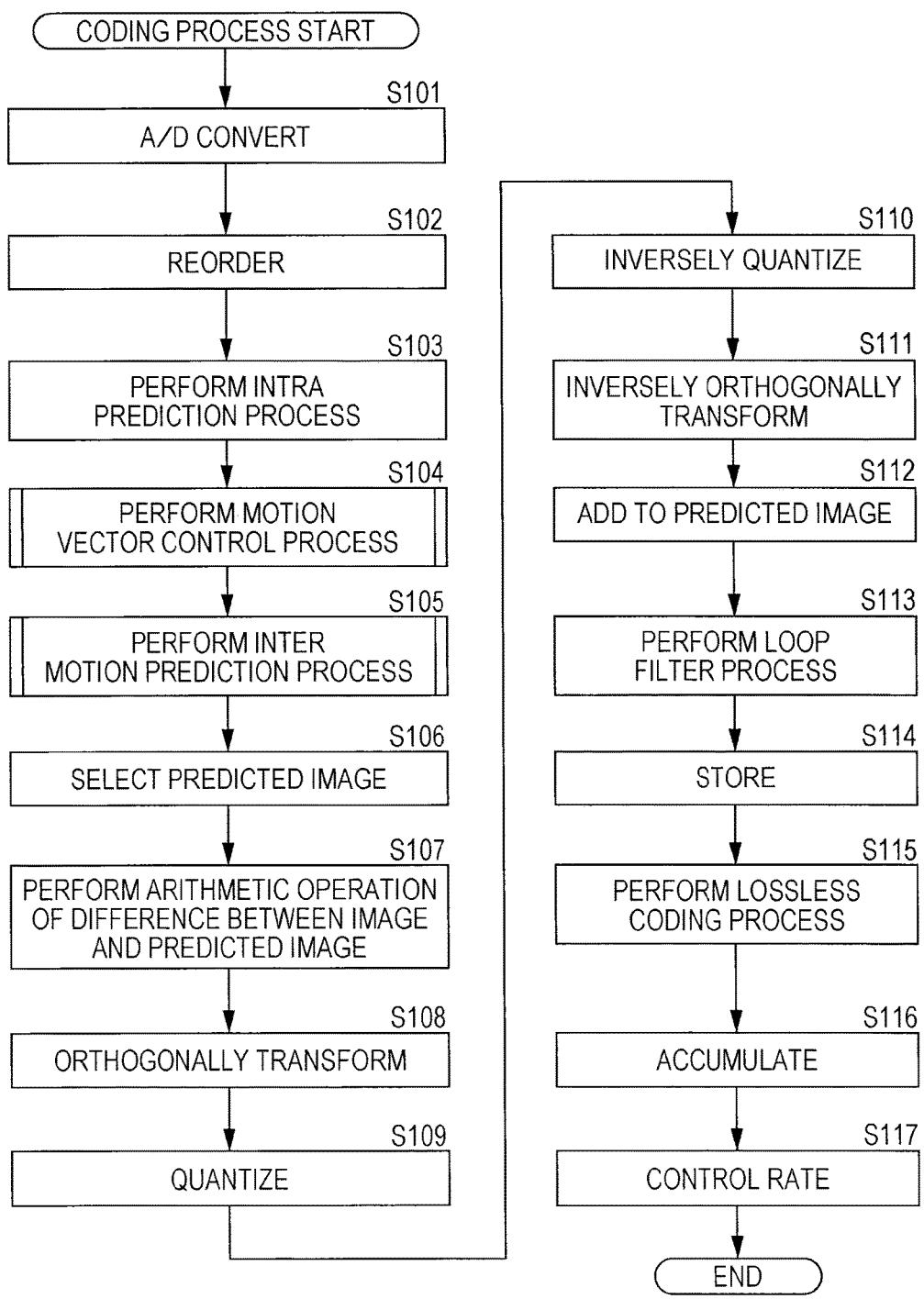
FIG. 7 is a flowchart illustrating an example of a flow of a coding process.
Figure 8:
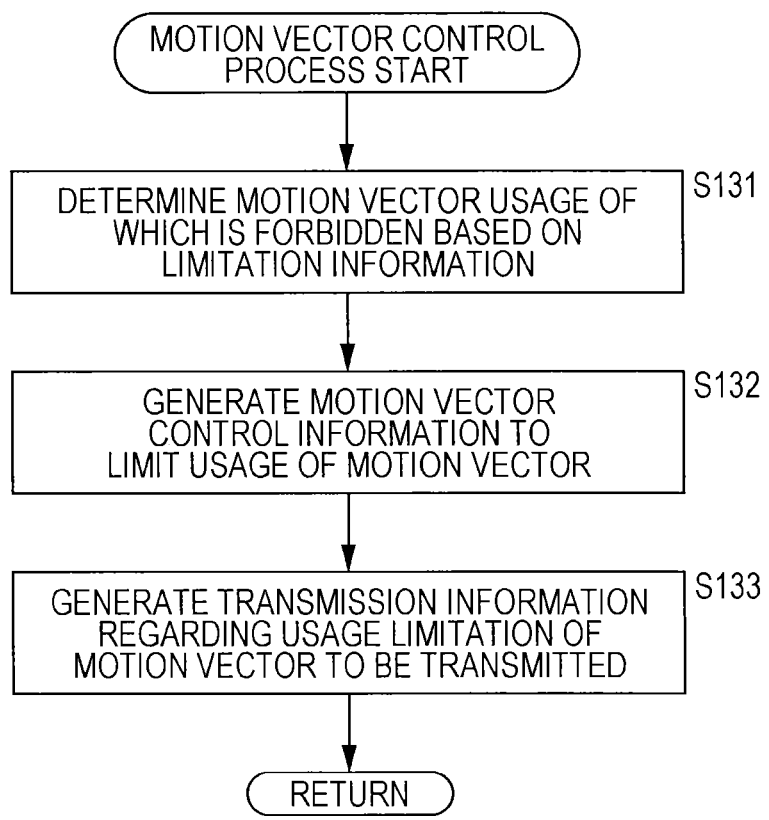
FIG. 8 is a flowchart illustrating an example of a flow of a motion vector control process.

Next, an example of a flow of the motion vector control process executed at step S104 in FIG. 7 is described with reference to a flowchart in FIG. 8.

When the motion vector control process is started, the limitation controller 162 of the motion vector controller 121 determines the motion vector, usage of which is forbidden, based on the limitation information read from the limitation information storage unit 161 at step S131.

At step S132, the limitation controller 162 generates the motion vector control information indicating a detail of usage limitation of the motion vector determined at step S131 and supplies the same to the motion search unit 151.

At step S133, the transmission information providing unit 163 generates the transmission information for transmission indicating the detail of the usage limitation of the motion vector determined at step S131 and supplies the same to the lossless coding unit 106 to be transmitted.

When the process at step S133 is finished, the transmission information providing unit 163 finishes the motion vector control process and returns the procedure to FIG. 7.

[Flow of Inter Motion Prediction Process]

Figure 9:
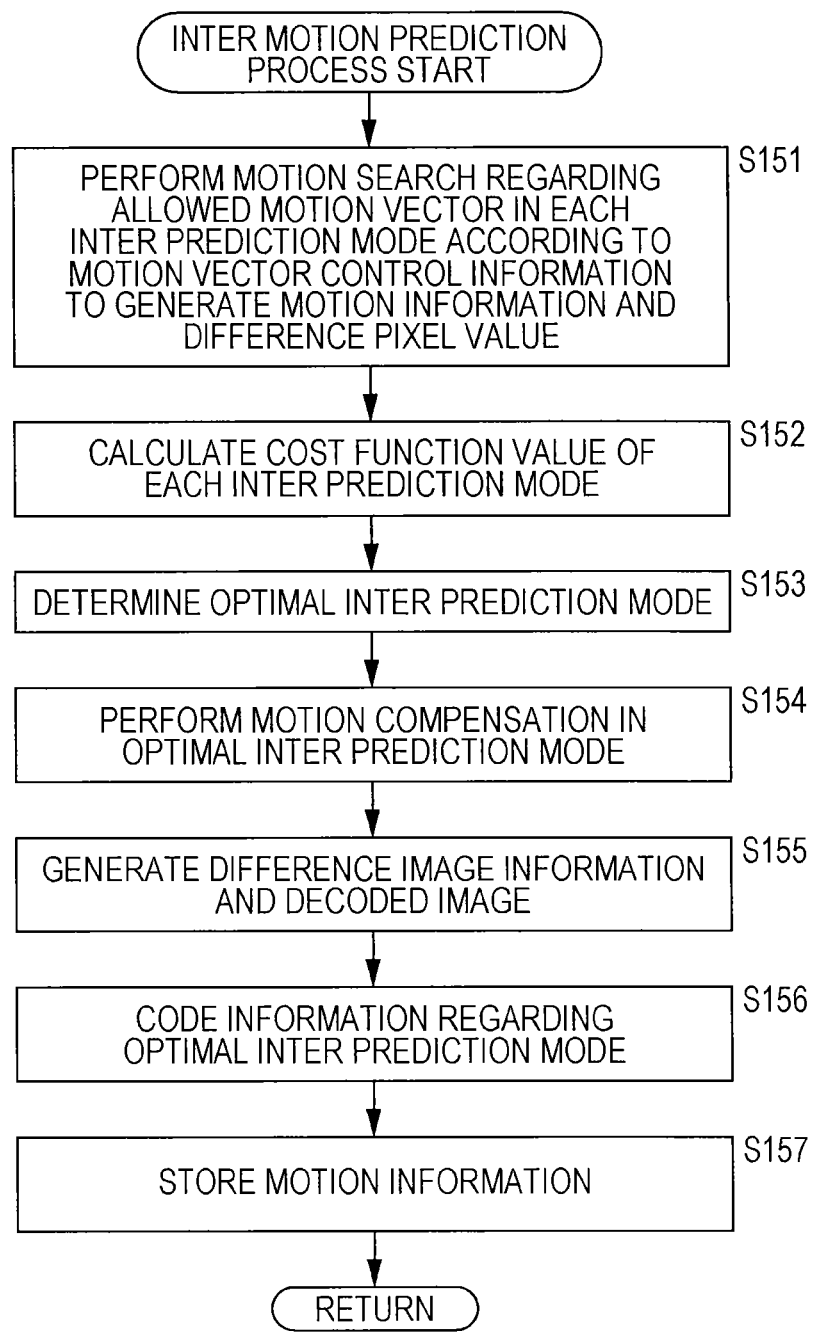
FIG. 9 is a flowchart illustrating an example of a flow of an inter motion prediction process.

Next, an example of a flow of the inter motion prediction process executed at step S105 in FIG. 7 is described with reference to a flowchart in FIG. 9.

When the inter motion prediction process is started, at step S151, the motion search unit 151 performs the motion search for each of the allowed inter prediction modes being the candidates according to the limitation detail indicated in the motion vector control information generated by the process at step S132 to generate the motion information and the difference pixel value.

At step S152, the cost function calculation unit 152 calculates the cost function value for each of the allowed inter prediction modes being the candidates based on the motion information and the difference pixel value obtained by the process at step S151.

At step S153, the mode determination unit 153 determines the mode in which the cost function value calculated at step S152 is the smallest as the optimal inter prediction mode.

At step S154, the motion compensation unit 154 performs the motion compensation in the optimal inter prediction mode determined by the process at step S153 to generate the predicted image. The optimal inter prediction mode is the mode allowed to be used by the motion vector control information generated by the process at step S132.

At step S155, the motion compensation unit 154 supplies the predicted image generated by the process at step S154 to the predicted image selector 116 for generating difference image information and decoded image information. At step S156, the motion compensation unit 154 supplies the information regarding the optimal inter prediction mode (optimal prediction mode information and motion information) to the lossless coding unit 106 to be coded.

At step S157, the motion information buffer 155 stores the motion information of the optimal inter prediction mode.

When the process at step S157 is finished, the motion information buffer 155 finishes the optimal inter prediction mode and returns the procedure to FIG. 7.

The image coding apparatus 100 may lower the inhibition of the coding efficiency by executing each process in the above-described manner.

[Profile and Level]

The image coding apparatus 100 may also provide limitation according to a profile and a level when generating the stream. They are provided for an encoder to take into consideration available resources of the decoder. Herein, the term "resources" is intended to mean throughput, the memory bandwidth and the like. The profile determines an available encoding tool. The level is determined for further limiting within the tools available in the profile.

If the limitation detail of the profile and the level is specifically determined in a standard, it becomes possible to ensure that the stream generated based on the standard may be reproduced by the decoder complying with the standard.

For example, when an upper limit of the memory bandwidth regarding the motion compensation (MC) process is defined by the profile and the level, the encoder may ensure decoding by the decoder by generating the bit stream so as not to exceed the upper limit.

[Forwarding of Profile and Level]

In this case, the transmission information providing unit 163 includes information indicating the profile and the level, based on which the bit stream is generated by the image coding apparatus 100, in the transmission information. In general, the information regarding the profile and the level is added to (multiplexed with) the header information of the bit stream referred to as the sequence parameter set (SPS).

The decoder may read the information regarding the profile and the level included in the bit stream and figure out the resources required for decoding the stream.

[Specific Example]

It is more specifically described. The image coding apparatus 100 limits the stream to be generated. At that time, the image coding apparatus 100 limits according to the available resources of a supposed image decoding apparatus. The profile in which a P slice may be used is referred to as a BP (Baseline Profile) and the profile in which the P slice and a B slice may be used is referred to as a HP (High Profile).

The image coding apparatus 100 considers whether the image decoding apparatus may process the B slice, and when the B slice cannot be processed, this generates the stream based on the limitation of the BP and includes information indicating that the stream is generated by the limitation of the BP in the stream. In contrast, when the image decoding apparatus may process the B slice or when capability of the image decoding apparatus is not taken into consideration, the image coding apparatus 100 generates the stream based on limitation of the HP and includes information indicating that this is generated by the HP in the stream.

The image coding apparatus 100 further limits according to the level. For example, the level to limit the number of input pixels to be smaller than 18 in the tables in FIGS. 4 and 5 in the memory bandwidth is set to level=1 and the level to limit the number of input pixels to be smaller than 14 is set to level=2.

The image coding apparatus 100 determines the level in consideration of whether the upper limit of the memory bandwidth of the image decoding apparatus is 18 or larger or 14 or larger in the tables in FIGS. 4 and 5. The image coding apparatus 100 includes information indicating the level by which the stream is generated in the stream when generating the stream.

The image coding apparatus 100 generates the stream in a range allowed by the profile and the level determined by itself when encoding the image. Regarding the memory bandwidth, it is encoded by using that with the number of input pixels read for generating one pixel not larger than requirement of the level in the tables in FIGS. 4 and 5 based on the prediction mode of the block, the block size in the vertical and horizontal directions, and the MV.

[Another Example of Motion Vector Controller]

Meanwhile, the limitation information is arbitrary and is not limited to the above-described example. For example, it is also possible that a plurality of candidates for the limitation is included and the limitation to be adopted is selected therefrom according to various conditions.

Figure 10:
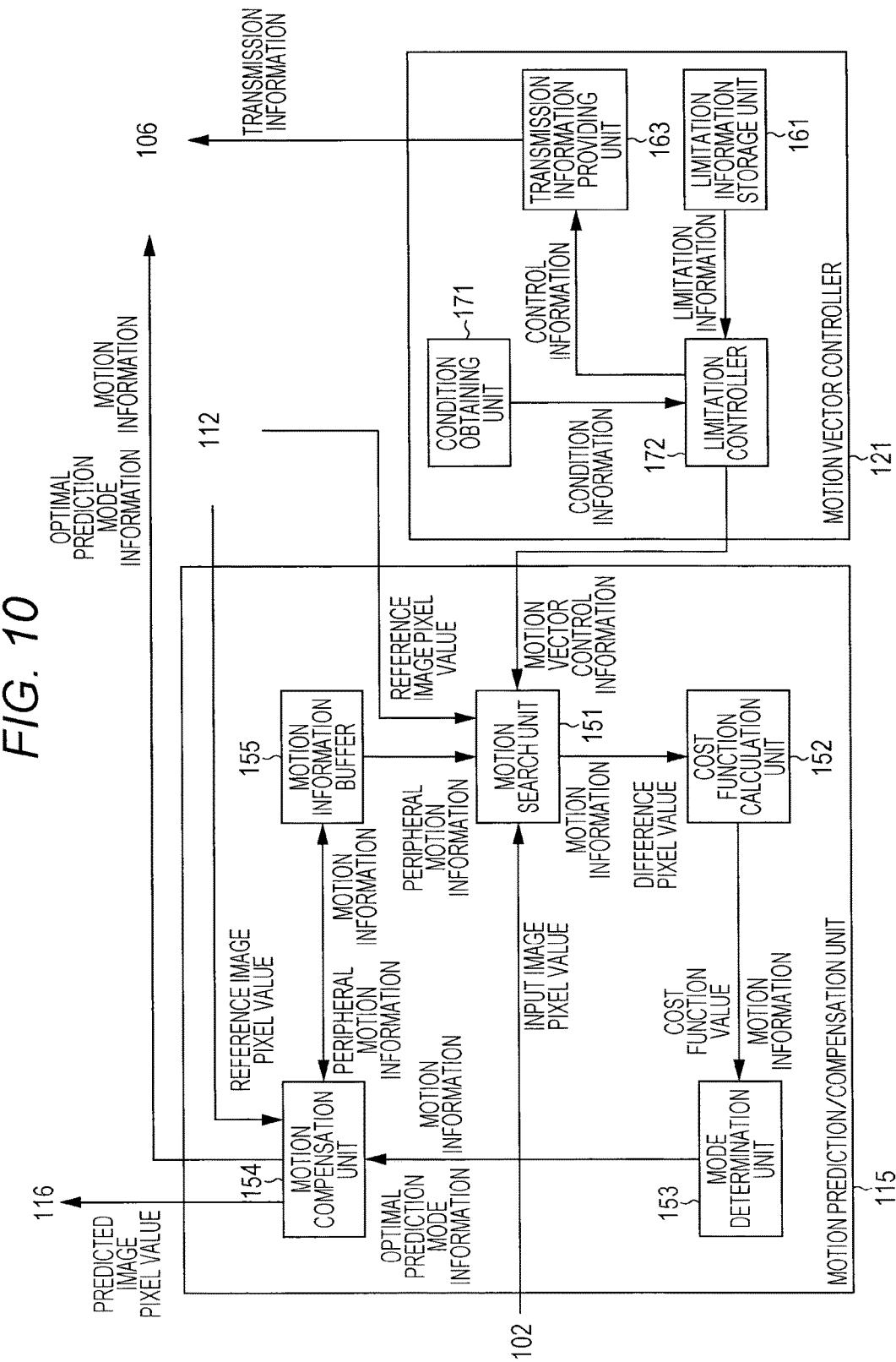
FIG. 10 is a block diagram of another configuration example of the motion prediction/compensation unit and the motion vector controller.

FIG. 10 is a block diagram of a principal configuration example of the motion vector controller 121 in such a case. In a case of the example illustrated in FIG. 10, the motion vector controller 121 includes a limitation controller 172 in place of the limitation controller 162 in FIG. 6. The motion vector controller 121 in FIG. 10 further includes a condition obtaining unit 171.

The condition obtaining unit 171 obtains the various conditions regarding the motion vector generation and notifies the limitation controller 172 of this as condition information. The condition is arbitrary and may be any information. For example, this may be specification of the motion vector allowed by a user and the like and the limitation, information regarding the resources such as an available memory bandwidth, or information regarding the limitation defined by a coding standard.

The limitation controller 172 determines the limitation detail of the motion vector based on such condition information and the limitation information read from the limitation information storage unit 161.

In this case, a plurality of patterns of the limitation detail is prepared in the limitation information and it is configured that the limitation controller 172 may select any of them according to the condition information. For example, it is also possible that the limitation information includes at least a plurality of conditions regarding the accuracy of the motion vector such as "a 4×4 block size is forbidden in L0 prediction or L1 prediction, 4×4, 8×4, 4×8, and 8×8 "efgijkpqr" are forbidden in bi-prediction" described above. In this case, the limitation controller 172 may determine the limitation detail according to the condition information by selecting any limitation detail according to the condition information.

It is also possible that the limitation information includes a predetermined arithmetic expression by which a plurality of arithmetic results may be obtained according to the condition. In this case, the limitation controller 172 may determine the limitation detail according to the condition information by determining a value of a coefficient of the arithmetic expression according to the condition information and performing an arithmetic operation by using the value.

Further, the limitation information may include table information illustrated in FIGS. 4 and 5. In this case, the limitation controller 172 may determine the limitation detail according to the condition information by determining the "number of input pixels" being the upper limit according to the condition information.

Meanwhile, although the memory alignment is fixed in the examples in FIGS. 4 and 5, it is also possible that the limitation information includes such table information about a pattern of each memory alignment. In this case, the limitation controller 172 may select the table to be applied by specifying (determining) the memory alignment according to the condition information and may further determine the limitation detail according to the condition information by determining the "number of input pixels" being the upper limit according to the condition information.

It is also possible that the limitation information includes the table in which it is determined in advance whether each row in the tables in FIGS. 4 and 5 is "allowed" or "forbidden" as in the examples illustrated in FIGS. 11 and 12. That is, in a case of this example, the combination of the prediction mode, the block size, and the accuracy of the motion vector to be allowed and to be forbidden is determined in advance. Therefore, the limitation controller 172 may determine the limitation detail according to the condition information only by specifying (determining) the memory alignment according to the condition information.

In this case also, the limitation other than the limitation by the accuracy of the motion vector is arbitrary. The limitation other than the prediction mode and the block size may be included or the limitation by the prediction mode and the block size may be omitted in the limitation by the motion vector control information. The transmission information may include the limitation detail by the motion vector control information. Further, any information is available as the limitation information and the condition as long as the limitation by the accuracy of the motion vector is included in the motion vector control information and the transmission information.

[Flow of Motion Vector Control Process]

Figure 13:
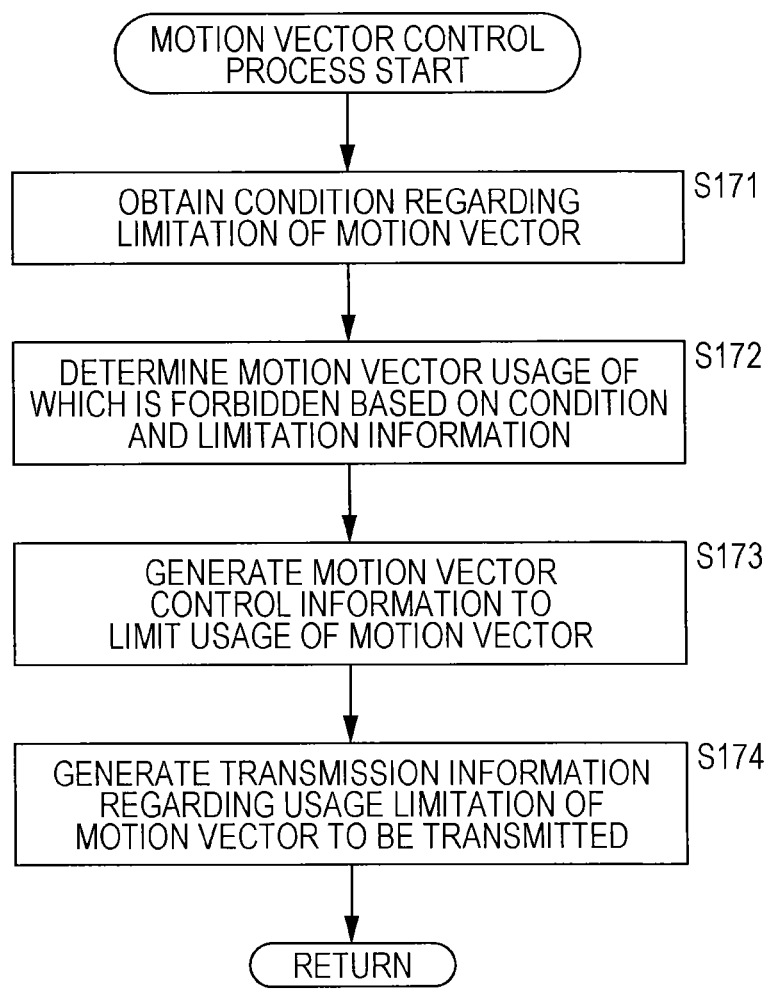
FIG. 13 is a flowchart illustrating another example of the flow of the motion vector control process.

Another example of the flow of the motion vector control process in this case is described with reference to a flowchart in FIG. 13.

When the motion vector control process is started, the condition obtaining unit 171 of the motion vector controller 121 obtains the condition regarding the limitation of the motion vector at step S171.

At step S172, the limitation controller 172 determines the motion vector, usage of which is forbidden, based on the condition obtained at step S171 and the limitation information read from the limitation information storage unit 161.

At step S173, the limitation controller 172 generates the motion vector control information indicating the detail of the usage limitation of the motion vector determined at step S172 and supplies the same to the motion search unit 151.

At step S174, the transmission information providing unit 163 generates the transmission information for transmission indicating the detail of the usage limitation of the motion vector determined at step S172 and supplies the same to the lossless coding unit 106 to be transmitted.

When the process at step S174 is finished, the transmission information providing unit 163 finishes the motion vector control process and returns the procedure to FIG. 7.

The image coding apparatus 100 may lower the inhibition of the coding efficiency by performing the process in the above-described manner.

2. Second Embodiment

[Image Decoding Apparatus]

In coded data (bit stream) generated by an image coding apparatus 100 in the above-described manner, only a used motion vector is limited, so that this may be decoded by a conventional method by a conventional image decoding apparatus complying with a coding standard similar to that of the image coding apparatus 100.

However, it is also possible that the image decoding apparatus determines whether this may safely and correctly decode the coded data by analyzing transmission information added to (multiplexed with) the coded data by the image coding apparatus 100 as a profile, a level and the like, for example. When it is determined that the image decoding device cannot decode the same, this may stop a decoding process. In this manner, it becomes possible to more surely, safely and correctly decode the coded data without unnecessary delay due to an overflow and an underflow.

Such image decoding apparatus is hereinafter described.

Figure 14:
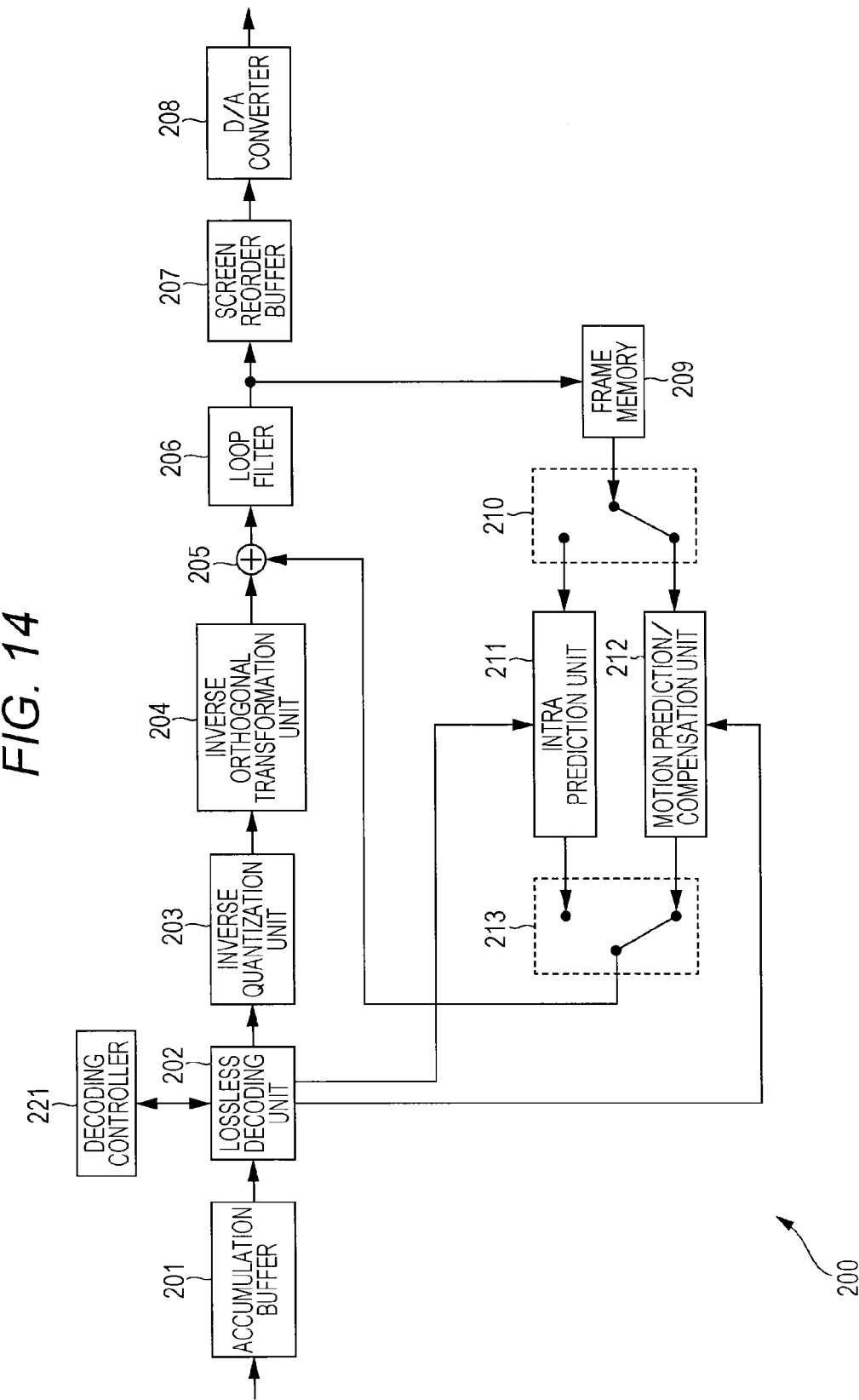
FIG. 14 is a block diagram of a principal configuration example of an image decoding apparatus.

FIG. 14 is a block diagram of a principal configuration example of the image decoding apparatus being an image processing apparatus to which this technology is applied. An image decoding apparatus 200 illustrated in FIG. 14 corresponding to the above-described image coding apparatus 100 correctly decodes the bit stream (coded data) generated by coding of image data by the image coding apparatus 100 to generate a decoded image.

As illustrated in FIG. 14, the image decoding apparatus 200 includes an accumulation buffer 201, a lossless decoding unit 202, an inverse quantization unit 203, an inverse orthogonal transformation unit 204, an arithmetic unit 205, a loop filter 206, a screen reorder buffer 207, and a D/A converter 208. The image decoding apparatus 200 also includes a frame memory 209, a selector 210, an intra prediction unit 211, a motion prediction/compensation unit 212, and a selector 213.

The image decoding apparatus 200 further includes a decoding controller 221.

The accumulation buffer 201 accumulates transmitted coded data and supplies the coded data to the lossless decoding unit 202 at a predetermined timing.

The lossless decoding unit 202 decodes information coded by a lossless coding unit 106 in FIG. 1 supplied from the accumulation buffer 201 by a scheme corresponding to a coding scheme of the lossless coding unit 106. The lossless decoding unit 202 supplies quantized coefficient data of a difference image obtained by decoding to the inverse quantization unit 203.

The lossless decoding unit 202 also refers to information regarding an optimal prediction mode obtained by decoding the coded data and determines whether an intra prediction mode is selected or an inter prediction mode is selected as the optimal prediction mode. That is, the lossless decoding unit 202 determines whether a prediction mode adopted in the transmitted coded data is intra prediction or inter prediction.

The lossless decoding unit 202 supplies information regarding the prediction mode to the intra prediction unit 211 or the motion prediction/compensation unit 212 based on a result of determination. For example, when the intra prediction mode is selected as the optimal prediction mode in the image coding apparatus 100, the lossless decoding unit 202 supplies intra prediction information being information regarding the selected intra prediction mode supplied from a coding side to the intra prediction unit 211. For example, when the inter prediction mode is selected as the optimal prediction mode in the image coding apparatus 100, the lossless decoding unit 202 supplies inter prediction information being information regarding the selected inter prediction mode supplied from the coding side to the motion prediction/compensation unit 212.

Further, the lossless decoding unit 202 supplies the transmission information added to (multiplexed with) the coded data, that is, information regarding a limitation detail of a motion vector to the decoding controller 221. For example, the lossless decoding unit 202 supplies information of a profile, a level and the like described in a sequence parameter set and the like to the decoding controller 221.

Meanwhile, when the lossless decoding unit 202 is instructed to stop a decoding process by the decoding controller 221 based on the transmission information, this stops its own process and a process of another processor to force-quit the decoding process.

The inverse quantization unit 203 inversely quantizes the quantized coefficient data obtained by the decoding by the lossless decoding unit 202 in a scheme corresponding to a quantization scheme of a quantization unit 105 in FIG. 1 (scheme similar to that of an inverse quantization unit 108). The inverse quantization unit 203 supplies an inversely quantized coefficient data to the inverse orthogonal transformation unit 204.

The inverse orthogonal transformation unit 204 inversely orthogonally transforms the coefficient data supplied from the inverse quantization unit 203 in a scheme corresponding to an orthogonal transform scheme of an orthogonal transformation unit 104 in FIG. 1. The inverse orthogonal transformation unit 204 obtains a difference image corresponding to a difference image before orthogonal transform by the image coding apparatus 100 by this inverse orthogonal transform process.

The difference image obtained by the inverse orthogonal transform is supplied to the arithmetic unit 205. A predicted image is supplied from the intra prediction unit 211 or the motion prediction/compensation unit 212 through the selector 213 to the arithmetic unit 205.

The arithmetic unit 205 adds the difference image and the predicted image to obtain a reconstructed image corresponding to an image before the predicted image is subtracted by an arithmetic unit 103 of the image coding apparatus 100. The arithmetic unit 205 supplies the reconstructed image to the loop filter 206.

The loop filter 206 appropriately performs a loop filter process including a deblocking filter process, an adaptive loop filter process and the like to the supplied reconstructed image, thereby generating a decoded image. For example, the loop filter 206 removes a block distortion by performing the deblocking filter process to the reconstructed image. For example, the loop filter 206 improves image quality by performing the loop filter process by using a Wiener filter to a result of the deblocking filter process (reconstructed image from which the block distortion is removed).

Meanwhile, an arbitrary type of the filter process may be performed by the loop filter 206 and a filter process other than the above-described one may also be performed. The loop filter 206 may perform the filter process by using a filter coefficient supplied from the image coding apparatus 100 in FIG. 1.

The loop filter 206 supplies the decoded image being the filter process result to the screen reorder buffer 207 and the frame memory 209. Meanwhile, the filter process by the loop filter 206 may be omitted. That i, it is also possible that an output of the arithmetic unit 205 is stored in the frame memory 209 without the filter process. For example, the intra prediction unit 211 uses a pixel value of a pixel included in the image as a pixel value of a peripheral pixel.

The screen reorder buffer 207 reorders the supplied decoded image. That is, frames reordered into order for coding by a screen reorder buffer 102 in FIG. 1 are reordered into original order of display. The D/A converter 208 D/A converts the decoded image supplied from the screen reorder buffer 207 and outputs the same to a display not illustrated to be displayed.

The frame memory 209 stores the supplied reconstructed image and decoded image. The frame memory 209 supplies the stored reconstructed image and decoded image through the selector 210 to the intra prediction unit 211 and the motion prediction/compensation unit 212 at a predetermined timing or upon external request of the intra prediction unit 211, the motion prediction/compensation unit 212 and the like.

Meanwhile, since usage of the motion vector is limited as described above in a coding process of the image coding apparatus 100, and increase in load (that is to say, an increase in memory bandwidth to be used) by a call of a reference image from the frame memory 209 is also inhibited as compared to a conventional case.

The intra prediction unit 211 performs the intra prediction based on the intra prediction information supplied from the lossless decoding unit 202 to generate the predicted image. Meanwhile, the intra prediction unit 211 performs the intra prediction in a mode similar to a mode of a process performed by an intra prediction unit 114 in FIG. 1 only for an area in which the predicted image is generated by the intra prediction at the time of coding based on the intra prediction information supplied from the lossless decoding unit 202.

The motion prediction/compensation unit 212 performs the inter prediction based on the inter prediction information supplied from the lossless decoding unit 202 to generate the predicted image. Meanwhile, the motion prediction/compensation unit 212 performs the inter prediction in a mode similar to a mode of a process performed by a motion prediction/compensation unit 115 in FIG. 1 only for an area in which the inter prediction is performed at the time of coding based on the inter prediction information supplied from the lossless decoding unit 202.

The intra prediction unit 211 or the motion prediction/compensation unit 212 supplies the generated predicted image through the selector 213 to the arithmetic unit 205 for each area of a prediction processing unit. The selector 213 supplies the predicted image supplied from the intra prediction unit 211 or the predicted image supplied from the motion prediction/compensation unit 212 to the arithmetic unit 205.

The decoding controller 221 controls whether to decode the coded data based on the transmission information supplied from the lossless decoding unit 202.

In this manner, the image decoding apparatus 200 may more surely decode the coded data in which a decrease in coding efficiency is inhibited and may more surely realize inhibition of the decrease in coding efficiency.

[Decoding Controller]

Figure 15:
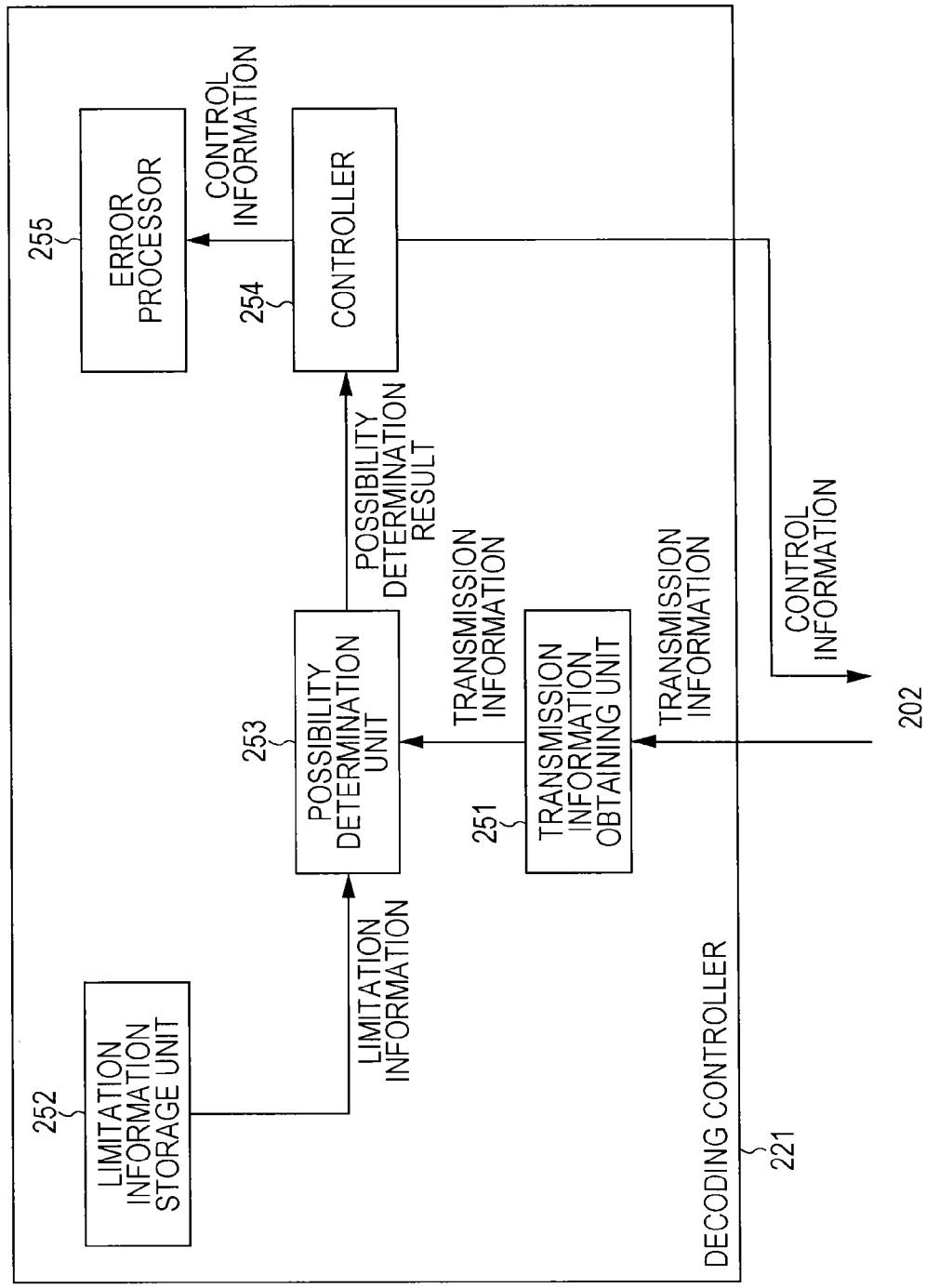
FIG. 15 is a block diagram of a principal configuration example of a decoding controller.

FIG. 15 is a block diagram of a principal configuration example of the decoding controller 221 in FIG. 14.

As illustrated in FIG. 15, the decoding controller 221 includes a transmission information obtaining unit 251, a limitation information storage unit 252, a possibility determination unit 253, a controller 254, and an error processor 255.

The transmission information obtaining unit 251 obtains the transmission information supplied from the lossless decoding unit 202. Any information is available as the transmission information; this may be information directly indicating the limitation detail of the motion vector or information specifying the profile and the level. The transmission information obtaining unit 251 supplies the obtained transmission information to the possibility determination unit 253.

The limitation information storage unit 252 stores the limitation information to limit an available motion vector. The limitation information is for inhibiting a degree of occupation of the memory bandwidth by reading of the reference image from the frame memory 209. The limitation information may at least include information capable of substantially limiting by accuracy of the motion vector in the possibility determination unit 253.

The possibility determination unit 253 determines whether the image decoding apparatus 200 may safely and correctly decode the coded data based on the limitation information read from the limitation information storage unit 252 and the transmission information supplied from the transmission information obtaining unit 251.

The transmission information includes information regarding limitation based on the accuracy of the motion vector in the coded data. Therefore, the possibility determination unit 253 may figure out the memory bandwidth required for decoding the coded data from the transmission information. The possibility determination unit 253 may also figure out an upper limit of an available memory bandwidth from the limitation based on the accuracy of the motion vector included in the limitation information. That is, the possibility determination unit 253 determines whether the coded data may be decoded by comparing them.

That is, when the memory bandwidth required for decoding the coded data is not larger than the upper limit of the available memory bandwidth, the possibility determination unit 253 determines that the coded data may be decoded. In contrast, when the memory bandwidth required for decoding the coded data is larger than the upper limit of the available memory bandwidth, the possibility determination unit 253 determines that the coded data cannot be decoded. Meanwhile, the possibility determination unit 253 may compare information substantially corresponding to the memory bandwidth such as information of the prediction mode, a block size, the accuracy of the motion vector and the like without directly comparing the memory bandwidth.

The possibility determination unit 253 supplies a result of such possibility determination to the controller 254. The controller 254 controls the decoding process based on the supplied possibility determination result. For example, when the coded data may be decoded, the controller 254 supplies the lossless decoding unit 202 with control information to instruct the same to decode. The lossless decoding unit 202 decodes according to the control information. Another processor also executes a process of each unit regarding the decoding.

When the coded data cannot be decoded, for example, the controller 254 supplies the error processor 255 with the control information to instruct the same to execute an error process. The error processor 255 performs the error process such as to notify a user of stop of the decoding process according to the control information. Further, the controller 254 supplies the lossless decoding unit 202 with the control information to instruct the same to stop decoding. The lossless decoding unit 202 stops the decoding process according to the control information. Another processor also stops the process of each unit regarding the decoding.

As described above, the decoding controller 221 may control the decoding process by using the limitation by the accuracy of the motion vector. Therefore, the decoding controller 221 may force-quit the decoding process of the coded data which cannot be decoded. Therefore, the decoding controller 221 may more surely decode the coded data in which the decrease in coding efficiency is inhibited. Therefore, the image decoding apparatus 200 may more surely realize the inhibition of the decrease in coding efficiency.

[Flow of Decoding Process]

Next, a flow of each process executed by the above-described image decoding apparatus 200 is described. First, an example of a flow of a decoding process is described with reference to a flowchart in FIG. 16.

When the decoding process is started, the accumulation buffer 201 accumulates the transmitted coded data at step S201. At step S202, the lossless decoding unit 202 decodes the coded data supplied from the accumulation buffer 201. That is, an I picture, a P picture, and a B picture coded by the lossless coding unit 106 in FIG. 1 are decoded.

At that time, information such as reference frame information, the prediction mode information (intra prediction mode or inter prediction mode) and the transmission information are also decoded.

At step S203, the decoding controller 221 performs a decoding control process based on the transmission information decoded by the process at step S202. When it is determined that the decoding process is force-quit in the decoding control process, the decoding process is finished at step S203. When it is determined to execute the decoding process in the decoding control process, processes after step S204 are executed.

At step S204, the inverse quantization unit 203 inversely quantizes a quantized orthogonal transform coefficient obtained by the process at step S202.

At step S205, the inverse orthogonal transformation unit 204 inversely orthogonally transforms the orthogonal transform coefficient obtained by the inverse quantization at step S203 by a method corresponding to that of the orthogonal transformation unit 104 in FIG. 1. According to this, difference information corresponding to an input of the orthogonal transformation unit 104 in FIG. 1 (output of the arithmetic unit 103) is decoded.

At step S206, the intra prediction unit 211 or the motion prediction/compensation unit 212 performs a prediction process of an image corresponding to the prediction mode information supplied from the lossless decoding unit 202. That is, in a case where the intra prediction mode information is supplied from the lossless decoding unit 202, the intra prediction unit 211 performs an intra prediction process in the intra prediction mode. When the inter prediction mode information is supplied from the lossless decoding unit 202, the motion prediction/compensation unit 212 performs an inter prediction process (including motion prediction and motion compensation) by using various pieces of information regarding a unit size obtained by the process at step S203.

At that time, in the coded data, the motion vector to be used is limited by the accuracy of the motion vector, the load of the reading of the reference image from the frame memory 209 is limited as a result.

At step S207, the arithmetic unit 205 adds the predicted image obtained by the process at step S206 to the difference information obtained by the process at step S205. According to this, original image data is decoded (the reconstructed image is obtained).

At step S208, the loop filter 206 performs the loop filter process. By this process, the loop filter process is appropriately performed to the reconstructed image obtained by the process at step S207. Meanwhile, the loop filter process is performed in a manner basically similar to that of the loop filter process described with reference to a flowchart in FIG. 7.

At step S209, the screen reorder buffer 207 reorders the frames of the decoded image to which the loop filter process is performed by the process at step S208. That is, the frames of the decoded image data reordered for the coding by the screen reorder buffer 102 of the image coding apparatus 100 (FIG. 1) are reordered into the original order of display.

At step S210, the D/A converter 208 D/A converts the decoded image data in which the frames are reordered by the process at step S209. The decoded image data is output to a display not illustrated and the image is displayed.

At step S211, the frame memory 209 stores the decoded image data to which the loop filter process is performed by the process at step S208.

[Flow of Decoding Control Process]

Figure 16:
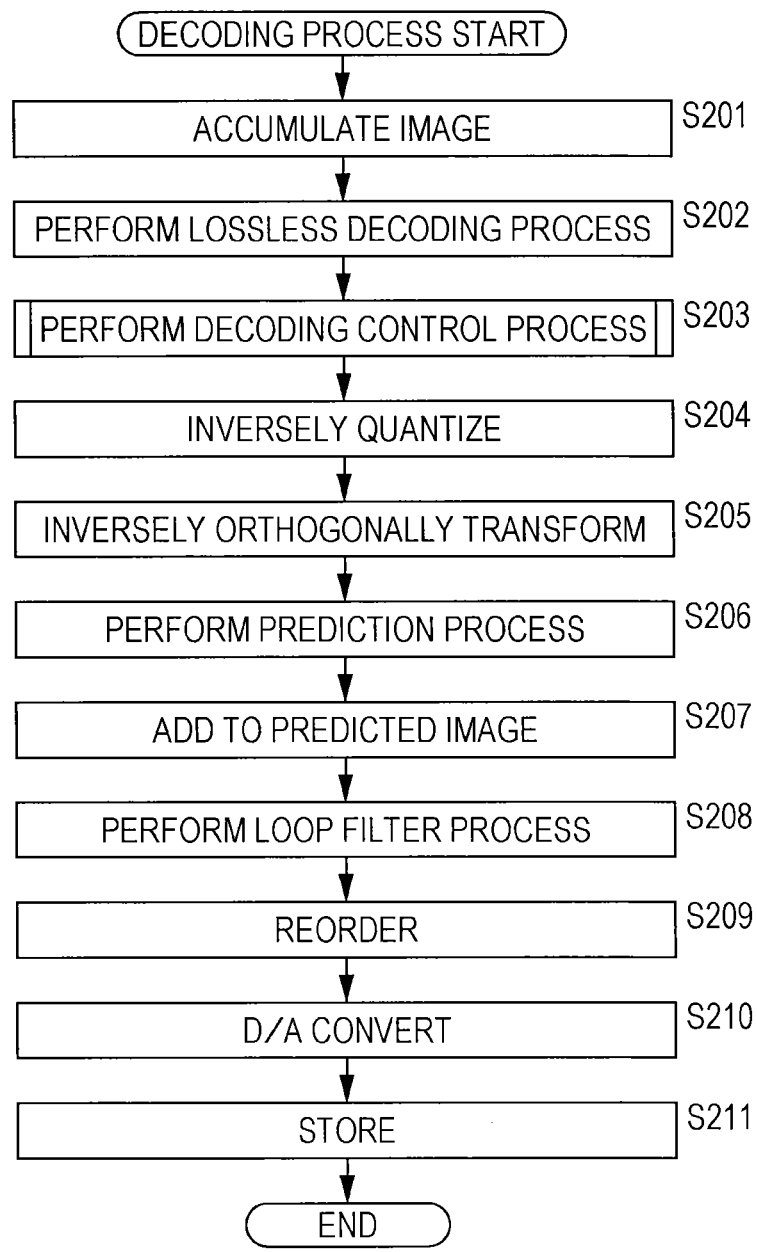
FIG. 16 is a flowchart illustrating an example of a flow of a decoding process.
Figure 17:
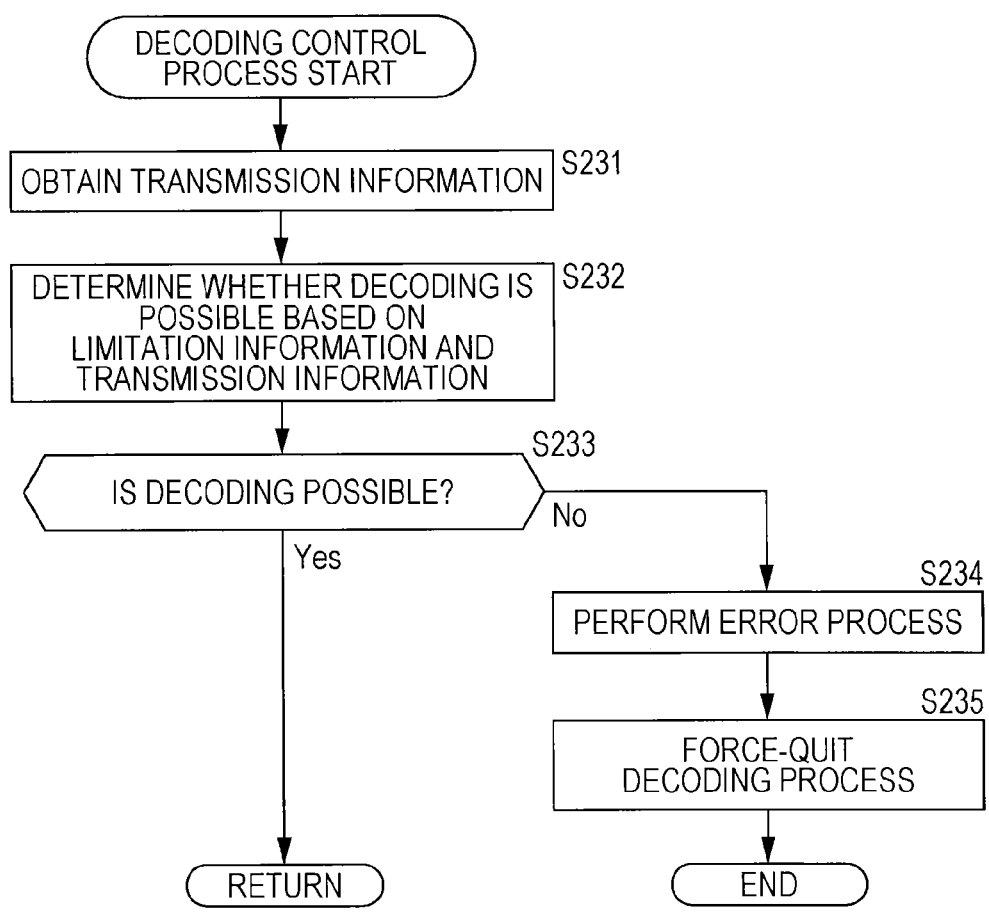
FIG. 17 is a flowchart illustrating an example of a flow of a decoding control process.

Next, an example of a flow of the decoding control process executed at step S203 in FIG. 16 is described with reference to a flowchart in FIG. 17.

When the decoding control process is started, at step S231, the transmission information obtaining unit 251 obtains the transmission information supplied from the lossless decoding unit 202.

At step S232, the possibility determination unit 253 determines whether the coded data supplied to the lossless decoding unit 202 can be decoded based on the control information and the transmission information. At step S233, the controller 254 selects a process based on the result of the determination. That is, when it is determined that this may be decoded, the controller 254 finishes the decoding control process and returns the procedure to FIG. 16 to execute the processes after step S204.

When it is determined that this cannot be decoded, at step S233, the controller 254 shifts the procedure to step S234. At step S234, the error processor 255 performs a predetermined error process. At step S235, the controller 254 force-quits the decoding process by controlling the lossless decoding unit 202 and the like. When the process at step S235 is finished, the controller 254 finishes the decoding control process.

The image decoding apparatus 200 may more surely decode the coded data in which the decrease in coding efficiency is inhibited by performing each process in the above-described manner. Therefore, the image decoding apparatus 200 may more surely realize the inhibition of the decrease in coding efficiency.

[Another Example of Decoding Controller]

Meanwhile, the limitation information is arbitrary and is not limited to the above-described example. For example, it is also possible that a plurality of candidates for the limitation is included and the limitation to be adopted is selected therefrom according to various conditions.

Figure 18:
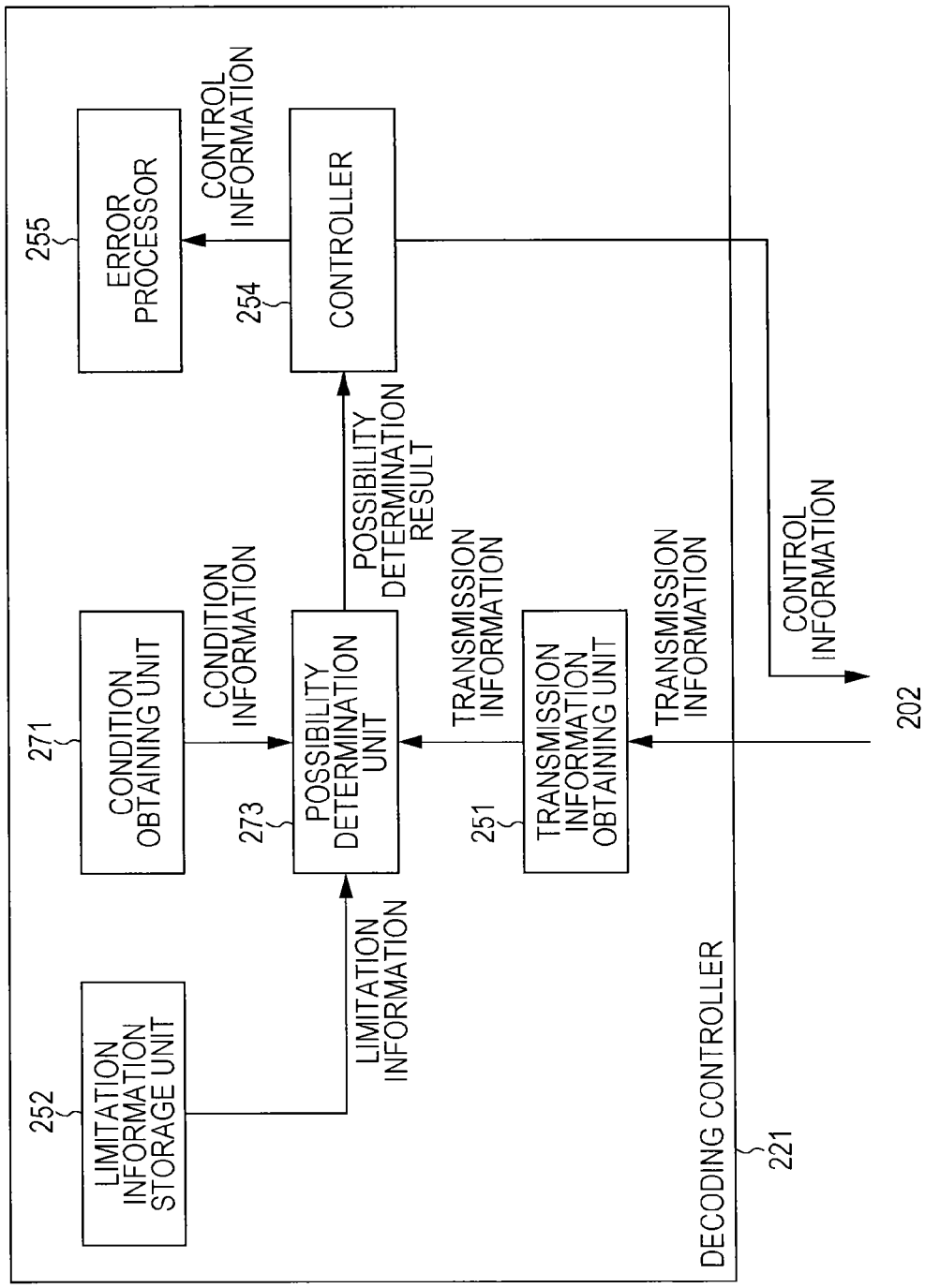
FIG. 18 is a block diagram of another configuration example of the decoding controller.

FIG. 18 is a block diagram of a principal configuration example of the decoding controller 221 in such a case. In a case of the example illustrated in FIG. 18, the decoding controller 221 includes a possibility determination unit 273 in place of the possibility determination unit 253 in FIG. 15. The decoding controller 221 in FIG. 18 further includes a condition obtaining unit 271.

The condition obtaining unit 271 obtains the various conditions regarding motion vector generation and notifies the possibility determination unit 273 of the same as condition information. The condition is arbitrary and may be any information. For example, this may be specification of the motion vector allowed by a user and the like and the limitation, information regarding the resources such as an available memory bandwidth, or information regarding the limitation defined by a coding standard.

The possibility determination unit 273 determines the limitation detail of the motion vector based on such condition information and the limitation information read from the limitation information storage unit 252.

In this case, a plurality of patterns of limitation detail is prepared in the limitation information and it is configured that the possibility determination unit 273 may select any of them according to the condition information. For example, it is also possible that the limitation information includes at least a plurality of conditions regarding the accuracy of the motion vector such as "a 4×4 block size is forbidden in L0 prediction or L1 prediction, 4×4, 8×4, 4×8, and 8×8 "efgijkpqr" are forbidden in bi-prediction" described above.

In this case, the possibility determination unit 273 may determine the limitation detail according to the condition information by selecting any limitation detail according to the condition information.

It is also possible that the limitation information includes a predetermined arithmetic expression by which a plurality of arithmetic results may be obtained according to the condition. In this case, the possibility determination unit 273 may determine the limitation detail according to the condition information by determining a value of a coefficient of the arbitrary expression according to the condition information and performing an arithmetic operation by using the value.

Further, the limitation information may include table information illustrated in FIGS. 4 and 5. In this case, the possibility determination unit 273 may determine the limitation detail according to the condition information by determining the "number of input pixels" being an upper limit according to the condition information.

Meanwhile, although the memory alignment is fixed in the examples in FIGS. 4 and 5, it is also possible that the limitation information includes such table information about a pattern of each memory alignment. In this case, the possibility determination unit 273 may select the table to be applied by specifying (determining) the memory alignment according to the condition information and may determine the limitation detail according to the condition information by determining the "number of input pixels" being the upper limit according to the condition information.

It is also possible that the limitation information includes the table in which it is determined in advance whether each row in the tables in FIGS. 4 and 5 is "allowed" or "forbidden" as in the examples illustrated in FIGS. 11 and 12. That is, in a case of this example, the combination of the prediction mode, the block size, and the accuracy of the motion vector to be allowed and to be forbidden is determined in advance. Therefore, the possibility determination unit 273 may determine the limitation detail according to the condition information only by specifying (determining) the memory alignment according to the condition information.

In this case also, the limitation other than the limitation by the accuracy of the motion vector is arbitrary. The limitation other than the prediction mode and the block size may be included or the limitation by the prediction mode and the block size may be omitted in the limitation by the motion vector control information. Any information is available as the limitation information and the condition as long as the limitation by the accuracy of the motion vector is included in the motion vector control information and the transmission information.

The possibility determination unit 273 compares the limitation obtained in this manner with the transmission information as in the case in FIG. 15 (for example, various pieces of information such as the prediction mode, the block size, and the accuracy of the motion vector may be compared or they may be converted into the memory bandwidth to be compared), thereby determining whether the decoding process is possible. The possibility determination unit 273 supplies the determination result to the controller 254. The controller 254 controls the decoding process as in the case in FIG. 15 based on the determination result.

In this case also, the decoding controller 221 may control the decoding process by using the limitation by the accuracy of the motion vector. Therefore, the decoding controller 221 may force-quit the decoding process of the coded data which cannot be decoded. Therefore, the decoding controller 221 may more surely decode the coded data in which the decrease in coding efficiency is inhibited. Therefore, the image decoding apparatus 200 may more surely realize the inhibition of the decrease in coding efficiency.

[Flow of Decoding Control Process]

Figure 19:
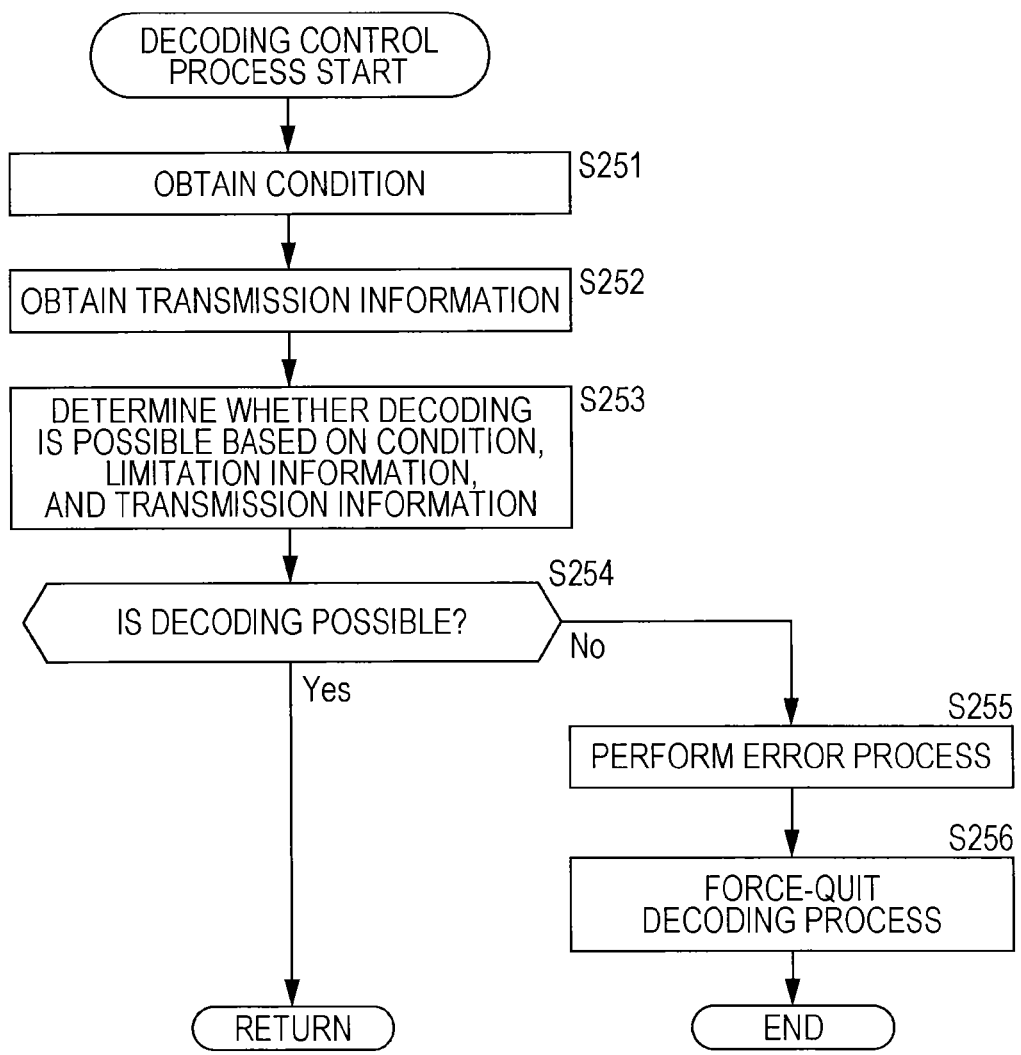
FIG. 19 is a flowchart illustrating another example of the flow of the decoding control process.

Next, an example of a flow of the decoding control process in this case is described with reference to a flowchart in FIG. 19.

When the decoding control process is started, the condition obtaining unit 271 obtains the condition at step S251. At step S252, the transmission information obtaining unit 251 obtains the transmission information supplied from the lossless decoding unit 202.

At step S253, the possibility determination unit 273 determines whether the coded data supplied to the lossless decoding unit 202 may be decoded based on the condition obtained at step S251, the control information read from the limitation information storage unit 252, and the transmission information obtained at step S252. At step S254, the controller 254 selects a process based on the determination result. That is, when it is determined that this may be decoded, the controller 254 finishes the decoding control process and returns the procedure to FIG. 16 to execute the processes after step S204.

When it is determined that the decoding cannot be performed, at step S255, the controller 254 shifts the procedure to step S255. At step S255, the error processor 255 performs a predetermined error process. At step S256, the controller 254 controls the lossless decoding unit 202 and the like to force-quit the decoding process. When the process at step S235 is finished, the controller 254 finishes the decoding control process.

The image decoding apparatus 200 may more surely decode the coded data in which the decrease in coding efficiency is inhibited by performing each process in the above-described manner. Therefore, the image decoding apparatus 200 may more surely realize the inhibition of the decrease in coding efficiency.

3. Third Embodiment

[Computer]

It is possible that the above-described series of processes is executed by hardware or executed by software. In this case, it may be configured as a computer illustrated in FIG. 29, for example.

Figure 20:
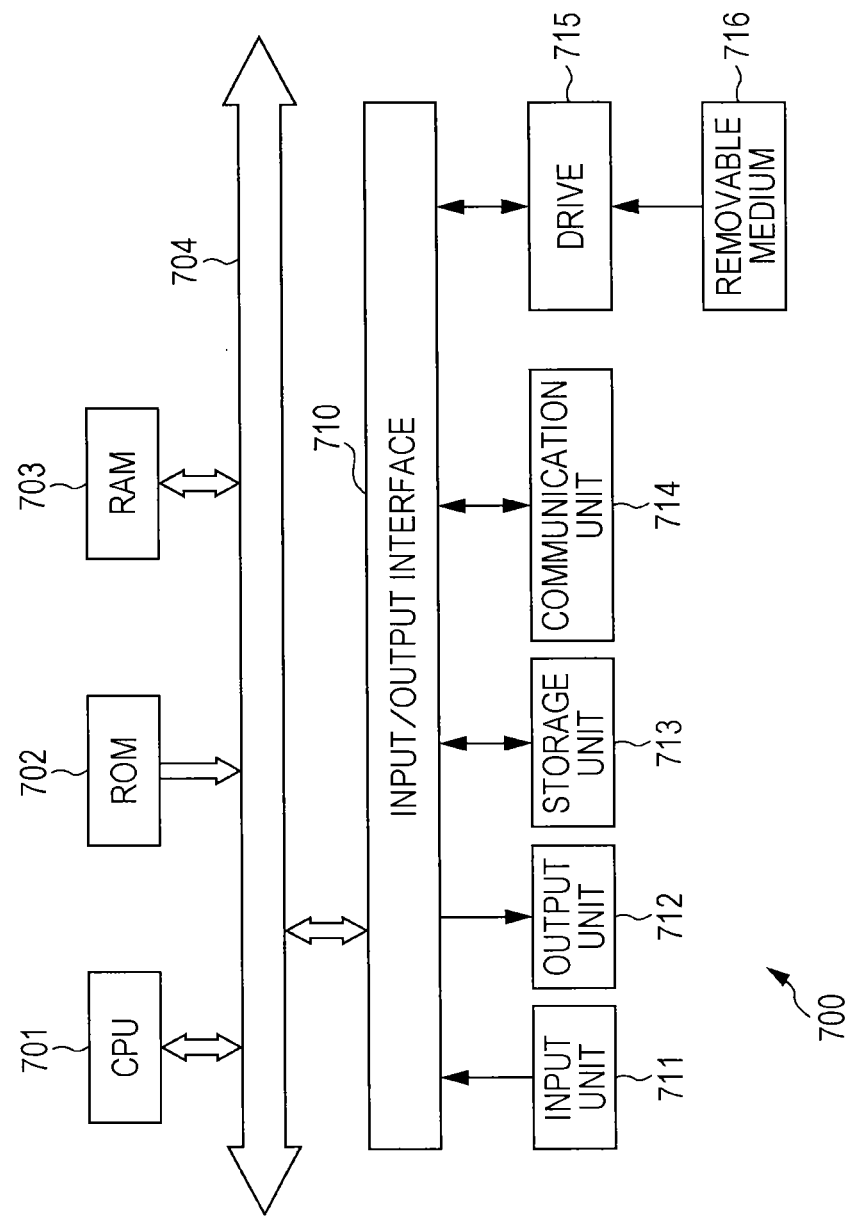
FIG. 20 is a block diagram of a principal configuration example of a computer.

In FIG. 20, a CPU (Central Processing Unit) 701 of a computer 700 executes various processes according to a program stored in a ROM (Read Only Memory) 702 or a program loaded from a storage unit 713 on a RAM (Random Access Memory) 703. Data necessary for the CPU 701 to execute the various processes also are appropriately stored in the RAM 703.

The CPU 701, the ROM 702, and the RAM 703 are connected to one another through a bus 704. An input/output interface 710 also is connected to the bus 704.

An input unit 711 formed of a keyboard, a mouse, a touch panel, an input terminal and the like, an output unit 712 formed of an arbitrary output device such as a display formed of a CRT (Cathode Ray Tube), an LCD (Liquid Crystal Display), an OELD (Organic ElectroLuminescence Display) and the like, and a speaker, an output terminal and the like, a storage unit 713 composed of an arbitrary storage medium such as a hard disc and a flash memory, a controller controlling input and output of the storage medium and the like, and a communication unit 714 formed of an arbitrary wired or wireless communication device such as a modem, a LAN interface, a USB (Universal Serial Bus), and Bluetooth (registered trademark) are connected to the input/output interface 710. The communication unit 714 performs a communication process with another communication device through a network including the Internet, for example.

A drive 715 is connected to the input/output interface 710 as needed. A removable medium 721 such as a magnetic disk, an optical disk, a magnetooptical disk, or a semiconductor memory is appropriately mounted on the drive 715. The drive 715 reads a computer program, data and the like from the removable medium 721 mounted thereon under control of the CPU 701, for example. The read data and computer program are supplied to the RAM 703, for example. The computer program read from the removable medium 721 is installed on the storage unit 713 as needed.

When the above-described series of processes is executed by the software, a program, which composes the software, is installed from the network or a recording medium.

The recording medium is composed not only of the removable medium 721 including the magnetic disc (including a flexible disc), the optical disc (including a CD-ROM (Compact Disc-Read Only Memory) and a DVD (Digital Versatile Disc)), the magnetooptical disc (including an MD (Mini Disc)), and the semiconductor memory, in which the program is recorded, distributed to a user for distributing the program separately from an apparatus main body but also of the ROM 702 in which the program is recorded and the hard disc included in the storage unit 713 distributed to the user in a state being embedded in advance in the apparatus main body as illustrated in FIG. 20, for example.

Meanwhile, the program executed by the computer may be the program of which processes are chronologically performed in order described in this specification or the program of which processes are performed in parallel or at a required timing such as when this is called.

Also, in this specification, a step of describing the program recorded in the recording medium includes not only the processes chronologically performed in the described order but also the processes executed in parallel or individually, which are not necessarily chronologically performed.

Also, in this specification, a system means an entire apparatus including a plurality of devices (apparatus).

It is also possible to divide the configuration described above as one apparatus (or processor) into a plurality of apparatuses (or processors). Other way round, it is also possible to put the configurations described above as a plurality of apparatuses (or processors) together as one apparatus (or processor). It goes without saying that a configuration other than the above-described one may be added to the configuration of each apparatus (or each processor). Further, it is also possible to add a part of the configuration of a certain apparatus (or processor) to the configuration of another apparatus (or another processor) as long as the configuration and operation as an entire system are substantially the same. That is, an embodiment of the present technology is not limited to the above-described embodiments and various modifications may be made without departing from the spirit of the present technology.

An image coding apparatus 100 (FIG. 1) and an image decoding apparatus 200 (FIG. 14) according to the above-described embodiments may be applied to various electronic devices such as a transmitter or a receiver in satellite broadcasting, cable broadcasting such as cable TV, distribution on the Internet, distribution to a terminal by cellular communication and the like, a recording apparatus which records an image on a medium such as the optical disc, the magnetic disc, and the flash memory, or a reproducing apparatus which reproduces the image from the storage medium. Four applications are hereinafter described.

4. Fourth Embodiment

[Television Apparatus]

Figure 21:
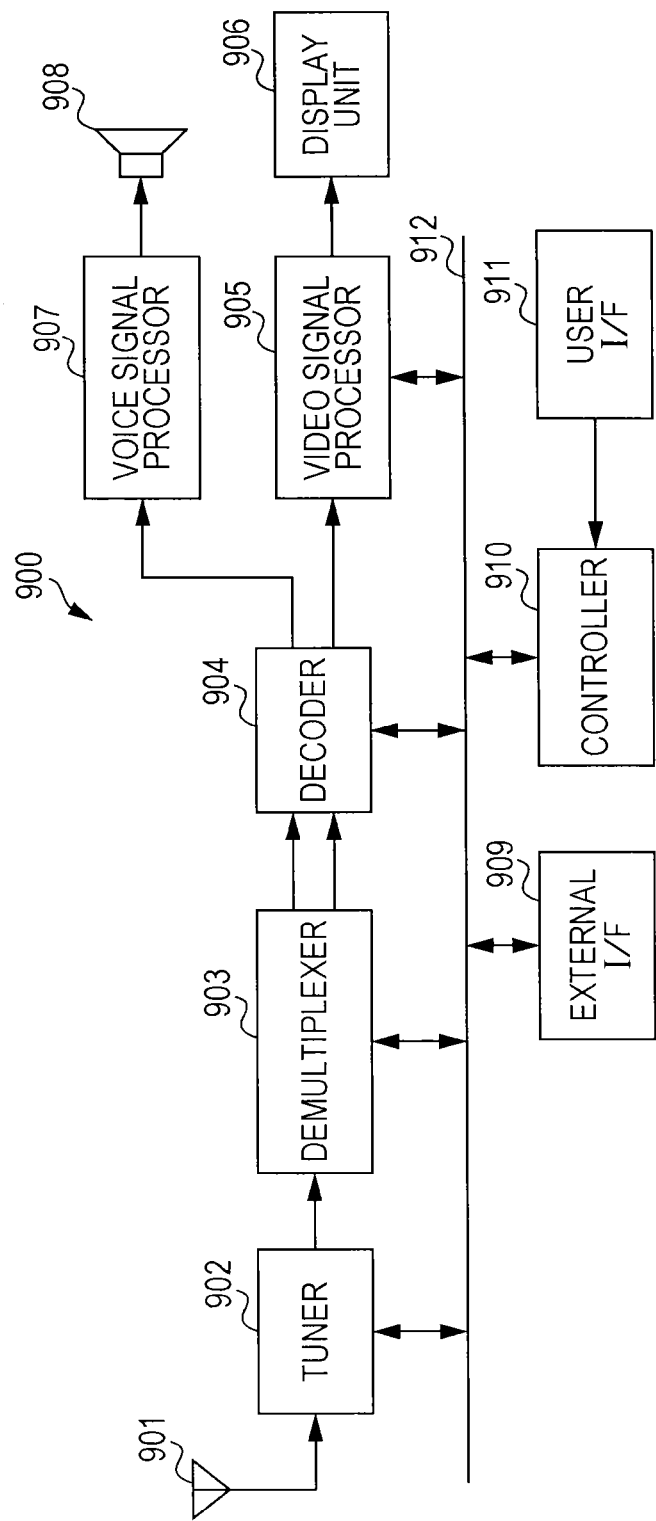
FIG. 21 is a block diagram of a principal configuration example of a television apparatus.

FIG. 21 illustrates an example of a schematic configuration of a television apparatus to which the above-described embodiment is applied. A television apparatus 900 includes an antenna 901, a tuner 902, a demultiplexer 903, a decoder 904, a video signal processor 905, a display unit 906, a voice signal processor 907, a speaker 908, an external interface 909, a controller 910, a user interface 911, and a bus 912.

The tuner 902 extracts a signal of a desired channel from a broadcast signal received through the antenna 901 and demodulates the extracted signal. Then, the tuner 902 outputs a coded bit stream obtained by demodulation to the demultiplexer 903. That is, the tuner 902 serves as a transmission unit in the television apparatus 900 which receives a coded stream in which an image is coded.

The demultiplexer 903 separates a video stream and a voice stream of a program to be watched from the coded bit stream and outputs each separated stream to the decoder 904. Also, the demultiplexer 903 extracts auxiliary data such as EPG (Electronic Program Guide) from the coded bit stream and supplies the extracted data to the controller 910. Meanwhile, the demultiplexer 903 may descramble when the coded bit stream is scrambled.

The decoder 904 decodes the video stream and the voice stream input from the demultiplexer 903. Then, the decoder 904 outputs video data generated by a decoding process to the video signal processor 905. Also, the decoder 904 outputs voice data generated by the decoding process to the voice signal processor 907.

The video signal processor 905 reproduces the video data input from the decoder 904 and allows the display unit 906 to display video. The video signal processor 905 may also allow the display unit 906 to display an application screen supplied through the network. The video signal processor 905 may also perform an additional process such as noise removal, for example, to the video data according to setting. Further, the video signal processor 905 may generate a GUI (Graphical User Interface) image such as a menu, a button, and a cursor, for example, and superimpose the generated image on an output image.

The display unit 906 is driven by a drive signal supplied from the video signal processor 905 to display the video or image on a video screen of a display device (for example, a liquid crystal display, a plasma display, an OELD (Organic ElectroLuminescence Display (organic EL display) and the like).

The voice signal processor 907 performs a reproducing process such as D/A conversion and amplification to the voice data input from the decoder 904 and allows the speaker 908 to output the voice. The voice signal processor 907 may also perform an additional process such as the noise removal to the voice data.

The external interface 909 is the interface for connecting the television apparatus 900 and an external device or the network. For example, the video stream or the voice stream received through the external interface 909 may be decoded by the decoder 904. That is, the external interface 909 also serves as the transmission unit in the television apparatus 900 which receives the coded stream in which the image is coded.

The controller 910 includes a processor such as the CPU and a memory such as the RAM and the ROM. The memory stores the program executed by the CPU, program data, the EPG data, data obtained through the network and the like. The program stored in the memory is read by the CPU at startup of the television apparatus 900 to be executed, for example. The CPU controls operation of the television apparatus 900 according to an operation signal input from the user interface 911, for example, by executing the program.

The user interface 911 is connected to the controller 910. The user interface 911 includes a button and a switch for the user to operate the television apparatus 900, a receiver of a remote control signal and the like, for example. The user interface 911 detects operation by the user through the components to generate the operation signal and outputs the generated operation signal to the controller 910.

The bus 912 connects the tuner 902, the demultiplexer 903, the decoder 904, the video signal processor 905, the voice signal processor 907, the external interface 909, and the controller 910 to one another.

In the television apparatus 900 configured in this manner, the decoder 904 has a function as an image decoding apparatus 200 (FIG. 14) according to the above-described embodiment. Therefore, it may be configured that the decoder 904 decodes only coded data generated by coding in which accuracy of a motion vector is taken into consideration in limitation of motion prediction. Therefore, the decoder 904 may more surely decode the coded data in which a decrease in coding efficiency is inhibited. Therefore, the television apparatus 900 may more surely realize the inhibition of the decrease in coding efficiency.

5. Fifth Embodiment

[Mobile Phone]

Figure 22:
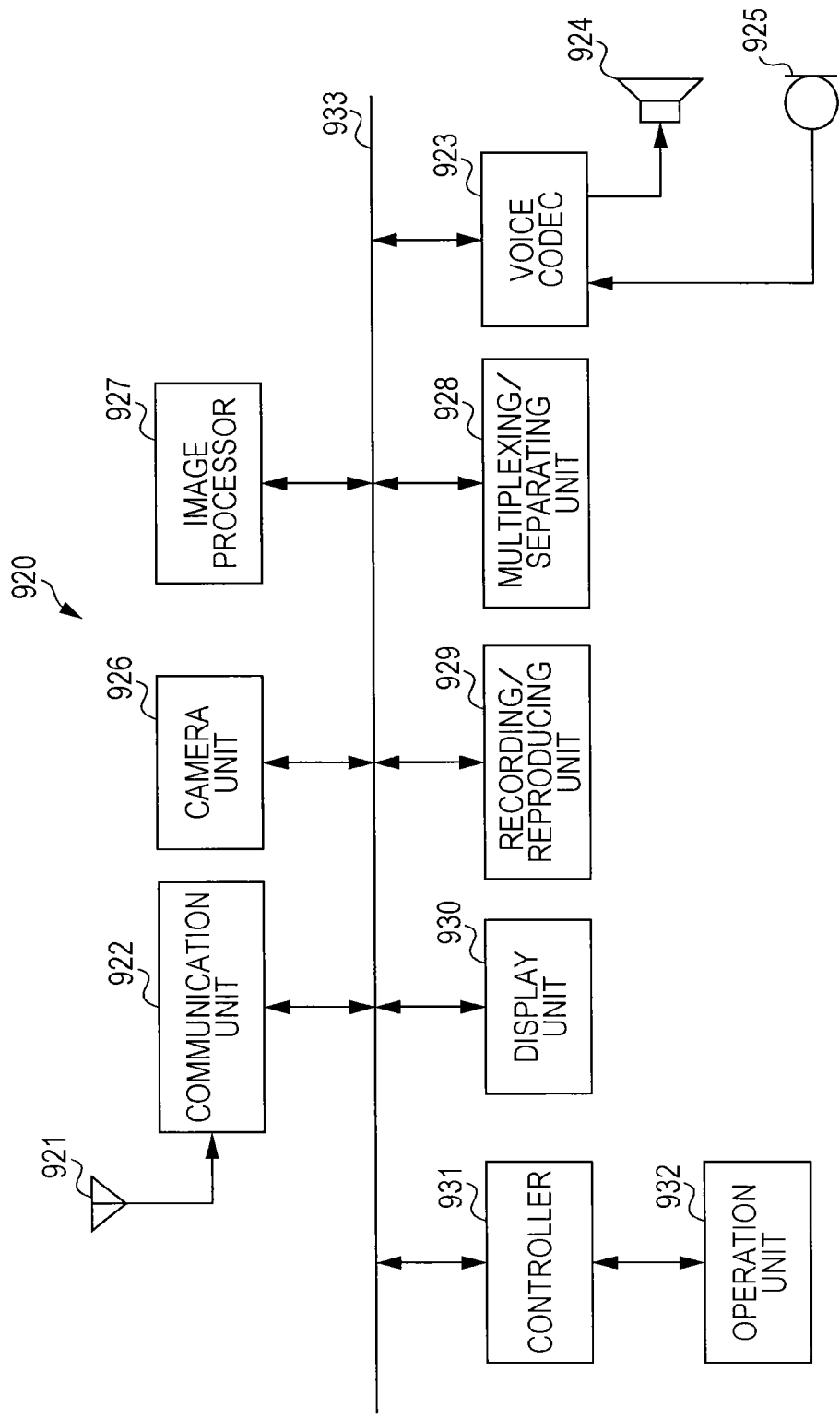
FIG. 22 is a block diagram of a principal configuration example of a mobile terminal.

FIG. 22 illustrates an example of a schematic configuration of a mobile phone to which the above-described embodiment is applied. A mobile phone 920 is provided with an antenna 921, a communication unit 922, a voice codec 923, a speaker 924, a microphone 925, a camera unit 926, an image processor 927, a multiplexing/separating unit 928, a recording/reproducing unit 929, a display unit 930, a controller 931, an operation unit 932, and a bus 933.

The antenna 921 is connected to the communication unit 922. The speaker 924 and the microphone 925 are connected to the voice codec 923. The operation unit 932 is connected to the controller 931. The bus 933 connects the communication unit 922, the voice codec 923, the camera unit 926, the image processor 927, the multiplexing/separating unit 928, the recording/reproducing unit 929, the display unit 930, and the controller 931 to one another.

The mobile phone 920 performs operation such as transmission/reception of a voice signal, transmission/reception of an e-mail or image data, image taking, and recording of data in various operation modes including a voice communication mode, a data communication mode, an imaging mode, and a television-phone mode.

In the voice communication mode, an analog voice signal generated by the microphone 925 is supplied to the voice codec 923. The voice codec 923 converts the analog voice signal to the voice data and A/D converts the converted voice data to compress. Then, the voice codec 923 outputs the compressed voice data to the communication unit 922. The communication unit 922 codes and modulates the voice data to generate a transmission signal. Then, the communication unit 922 transmits the generated transmission signal to a base station (not illustrated) through the antenna 921. Also, the communication unit 922 amplifies a wireless signal received through the antenna 921 and applies frequency conversion to the same to obtain a reception signal. Then, the communication unit 922 generates the voice data by demodulating and decoding the reception signal and outputs the generated voice data to the voice codec 923. The voice codec 923 expands the voice data and D/A converts the same to generate the analog voice signal. Then, the voice codec 923 supplies the generated voice signal to the speaker 924 to allow the same to output the voice.

In the data communication mode, for example, the controller 931 generates character data composing the e-mail according to the operation by the user through the operation unit 932. Also, the controller 931 allows the display unit 930 to display characters. The controller 931 generates e-mail data according to a transmission instruction from the user through the operation unit 932 to output the generated e-mail data to the communication unit 922. The communication unit 922 codes and modulates the e-mail data to generate the transmission signal. Then, the communication unit 922 transmits the generated transmission signal to a base station (not illustrated) through the antenna 921. Also, the communication unit 922 amplifies a wireless signal received through the antenna 921 and applies frequency conversion to the same to obtain a reception signal. Then, the communication unit 922 demodulates and decodes the reception signal to restore the e-mail data and outputs the restored e-mail data to the controller 931. The controller 931 allows the display unit 930 to display contents of the e-mail data and allows the storage medium of the recording/reproducing unit 929 to store the e-mail data.

The recording/reproducing unit 929 includes an arbitrary readable/writable storage medium. For example, the storage medium may be a built-in storage medium such as the RAM and the flash memory and may be an externally-mounted storage medium such as the hard disc, the magnetic disc, the magnetooptical disc, the optical disc, a USB memory, and a memory card.

In the imaging mode, for example, the camera unit 926 takes an image of an object to generate the image data and outputs the generated image data to the image processor 927. The image processor 927 codes the image data input from the camera unit 926 and stores the coded stream in the storage medium of the recording/reproducing unit 929.

Also, in the television-phone mode, for example, the multiplexing/separating unit 928 multiplexes the video stream coded by the image processor 927 and the voice stream input from the voice codec 923 and outputs the multiplexed stream to the communication unit 922. The communication unit 922 codes and modulates the stream to generate the transmission signal. Then, the communication unit 922 transmits the generated transmission signal to a base station (not illustrated) through the antenna 921. Also, the communication unit 922 amplifies a wireless signal received through the antenna 921 and applies frequency conversion to the same to obtain a reception signal. The transmission signal and the reception signal may include the coded bit stream. Then, the communication unit 922 restores the stream by demodulating and decoding the reception signal and outputs the restored stream to the multiplexing/separating unit 928. The multiplexing/separating unit 928 separates the video stream and the voice stream from the input stream and outputs the video stream and the voice stream to the image processor 927 and the voice codec 923, respectively. The image processor 927 decodes the video stream to generate the video data. The video data is supplied to the display unit 930 and a series of images is displayed by the display unit 930. The voice codec 923 expands the voice stream and D/A converts the same to generate the analog voice signal. Then, the voice codec 923 supplies the generated voice signal to the speaker 924 to allow the same to output the voice.

In the mobile phone 920 configured in this manner, the image processor 927 has a function of an image coding apparatus 100 (FIG. 1) according to the above-described embodiment. Therefore, the image processor 927 may limit motion prediction in consideration of accuracy of a motion vector. Therefore, the image processor 927 may inhibit an increase in load while inhibiting a decrease in coding efficiency to code an image. Therefore, the mobile phone 920 may lower the inhibition of the coding efficiency.

Meanwhile, the image processor 927 also has a function of an image decoding apparatus 200 (FIG. 14) according to the above-described embodiment. Therefore, it may be configured that the image processor 927 decodes only coded data generated by coding in which the accuracy of the motion vector is taken into consideration in the limitation of the motion prediction. Therefore, the image processor 927 may more surely decode the coded data in which the decrease in coding efficiency is inhibited. Therefore, the mobile phone 920 may more surely realize the inhibition of the decrease in coding efficiency.

Although it has been described above as the mobile phone 920, the image coding apparatus and the image decoding apparatus to which the present technology is applied may be applied to any apparatus having an imaging function and a communication function similar to those of the mobile phone 920 such as a PDA (Personal Digital Assistants), a smartphone, a UMPC (Ultra Mobile Personal Computer), a netbook, and a notebook computer, for example, as in the case of the mobile phone 920.

6. Sixth Embodiment

[Recording/Reproducing Apparatus]

Figure 23:
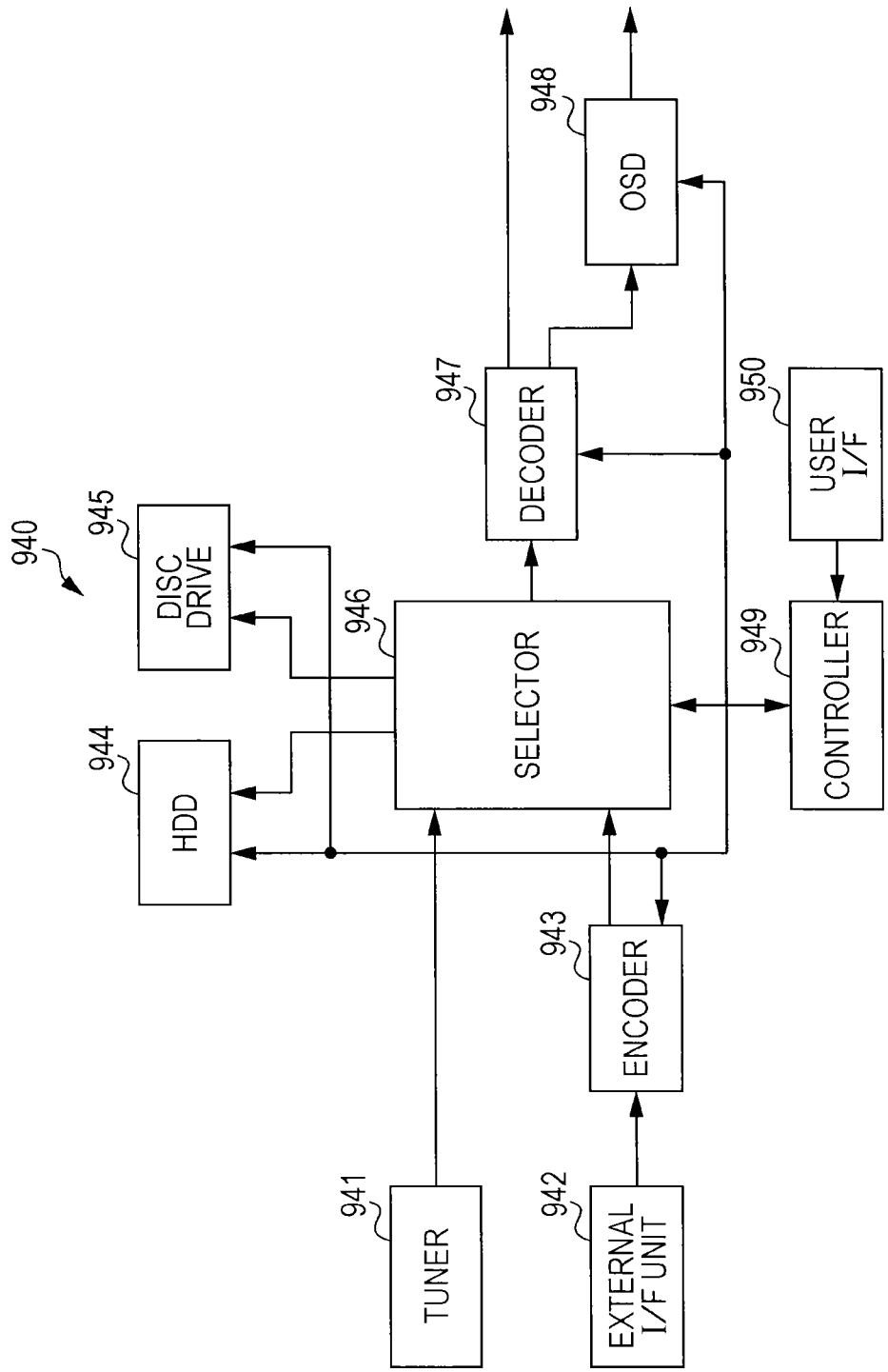
FIG. 23 is a block diagram of a principal configuration example of a recording/reproducing apparatus.

FIG. 23 illustrates an example of a schematic configuration of the recording/reproducing apparatus to which the above-described embodiment is applied. The recording/reproducing apparatus 940 codes the voice data and the video data of a received broadcast program to record on the recording medium, for example. Also, the recording/reproducing apparatus 940 may code the voice data and the video data obtained from another apparatus to record on the recording medium, for example. Also, the recording/reproducing apparatus 940 reproduces the data recorded on the recording medium by a monitor and the speaker according to the instruction of the user. At that time, the recording/reproducing apparatus 940 decodes the voice data and the video data.

The recording/reproducing apparatus 940 is provided with a tuner 941, an external interface 942, an encoder 943, a HDD (Hard Disk Drive) 944, a disc drive 945, a selector 946, a decoder 947, an OSD (On-Screen Display) 948, a controller 949, and a user interface 950.

The tuner 941 extracts a signal of a desired channel from the broadcast signal received through an antenna (not illustrated) and demodulates the extracted signal. Then, the tuner 941 outputs the coded bit stream obtained by the demodulation to the selector 946. That is, the tuner 941 serves as a transmission unit in the recording/reproducing apparatus 940.

The external interface 942 is the interface for connecting the recording/reproducing apparatus 940 and the external device or the network. The external interface 942 may be an IEEE1394 interface, a network interface, a USB interface, a flash memory interface and the like, for example. For example, the video data and the voice data received through the external interface 942 are input to the encoder 943. That is, the external interface 942 serves as the transmission unit in the recording/reproducing apparatus 940.

The encoder 943 codes the video data and the voice data when the video data and the voice data input from the external interface 942 are not coded. Then, the encoder 943 outputs the coded bit stream to the selector 946.

The HDD 944 records the coded bit stream in which contents data such as video and voice are compressed, various programs, and other data on an internal hard disc. The HDD 944 reads the data from the hard disc when reproducing the video and the voice.

The disc drive 945 records and reads the data on and from the mounted recording medium. The recording medium mounted on the disc drive 945 may be the DVD disc (DVD-Video, DVD-RAM, DVD-R, DVD-RW, DVD+R, DVD+RW and the like), a Blu-ray (registered trademark) disc and the like, for example.

The selector 946 selects the coded bit stream input from the tuner 941 or the encoder 943 and outputs the selected coded bit stream to the HDD 944 or the disc drive 945 when recording the video and the voice. Also, the selector 946 outputs the coded bit stream input from the HDD 944 or the disc drive 945 to the decoder 947 when reproducing the video and the voice.

The decoder 947 decodes the coded bit stream to generate the video data and the voice data. Then, the decoder 947 outputs the generated video data to the OSD 948. Also, the decoder 904 outputs the generated voice data to an external speaker.

The OSD 948 reproduces the video data input from the decoder 947 to display the video. The OSD 948 may also superimpose the GUI image such as the menu, the button, and the cursor, for example, on the displayed video.

The controller 949 includes the processor such as the CPU and the memory such as the RAM and ROM. The memory stores the program executed by the CPU, the program data and the like. The program stored in the memory is read by the CPU to be executed on activation of the recording/reproducing apparatus 940, for example. The CPU controls operation of the recording/reproducing apparatus 940 according to an operation signal input from the user interface 950, for example, by executing the program.

The user interface 950 is connected to the controller 949. The user interface 950 includes a button and a switch for the user to operate the recording/reproducing apparatus 940 and a receiver of a remote control signal, for example. The user interface 950 detects operation by the user through the components to generate the operation signal and outputs the generated operation signal to the controller 949.

In the recording/reproducing apparatus 940 configured in this manner, the encoder 943 has a function of an image coding apparatus 100 (FIG. 1) according to the above-described embodiments. Therefore, the encoder 943 may limit motion prediction in consideration of accuracy of a motion vector. Therefore, the encoder 943 may inhibit an increase in load while inhibiting a decrease in coding efficiency to code an image. Therefore, the recording/reproducing apparatus 940 may lower the inhibition of the coding efficiency.

In the recording/reproducing apparatus 940 configured in this manner, the decoder 947 has a function of an image decoding apparatus 200 (FIG. 14) according to the above-described embodiment. Therefore, it may be configured that the decoder 947 decodes only coded data generated by coding in which the accuracy of the motion vector is taken into consideration in the limitation of the motion prediction. Therefore, the decoder 947 may more surely decode the coded data in which the decrease in coding efficiency is inhibited. Therefore, the recording/reproducing apparatus 940 may more surely realize the inhibition of the decrease in coding efficiency.

7. Seventh Embodiment

[Imaging Apparatus]

Figure 24:
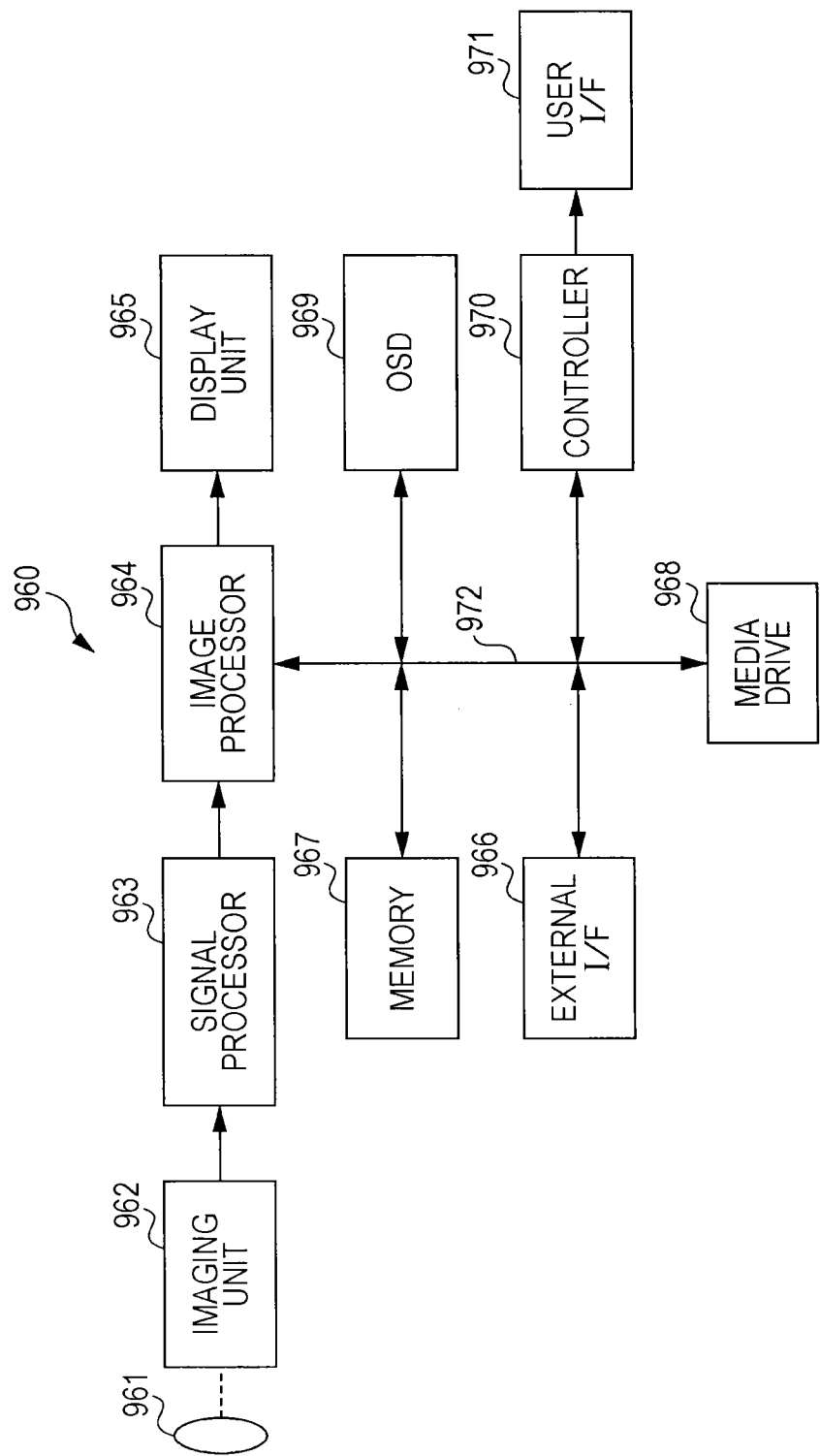
FIG. 24 is a block diagram of a principal configuration example of an imaging apparatus.

FIG. 24 illustrates an example of a schematic configuration of an imaging apparatus to which the above-described embodiment is applied. An imaging apparatus 960 takes an image of the object to generate the image, codes the image data and records the same on the recording medium.

The imaging apparatus 960 is provided with an optical block 961, an imaging unit 962, a signal processor 963, an image processor 964, a display unit 965, an external interface 966, a memory 967, a media drive 968, an OSD 969, a controller 970, a user interface 971, and a bus 972.

The optical block 961 is connected to the imaging unit 962. The imaging unit 962 is connected to the signal processor 963. The display unit 965 is connected to the image processor 964. The user interface 971 is connected to the controller 970. The bus 972 connects the image processor 964, the external interface 966, the memory 967, the media drive 968, the OSD 969, and the controller 970 to one another.

The optical block 961 includes a focus lens, a diaphragm mechanism and the like. The optical block 961 forms an optical image of the object on an imaging surface of the imaging unit 962. The imaging unit 962 includes an image sensor such as a CCD and a CMOS and converts the optical image formed on the imaging surface to an image signal as an electric signal by photoelectric conversion. Then, the imaging unit 962 outputs the image signal to the signal processor 963.

The signal processor 963 performs various camera signal processes such as knee correction, gamma correction, color correction to the image signal input from the imaging unit 962. The signal processor 963 outputs the image data after the camera signal process to the image processor 964.

The image processor 964 codes the image data input from the signal processor 963 to generate the coded data. Then, the image processor 964 outputs the generated coded data to the external interface 966 or the media drive 968. Also, the image processor 964 decodes the coded data input from the external interface 966 or the media drive 968 to generate the image data. Then, the image processor 964 outputs the generated image data to the display unit 965. The image processor 964 may also output the image data input from the signal processor 963 to the display unit 965 to display the image. The image processor 964 may also superimpose data for display obtained from the OSD 969 on the image output to the display unit 965.

The OSD 969 generates the GUI image such as the menu, the button, and the cursor, for example, and outputs the generated image to the image processor 964.

The external interface 966 is composed as an USB input/output terminal, for example. The external interface 966 connects the imaging apparatus 960 and a printer when printing the image, for example. Also, a drive is connected to the external interface 966 as needed. The removable medium such as the magnetic disc and the optical disc is mounted on the drive, for example, and the program read from the removable medium may be installed on the imaging apparatus 960. Further, the external interface 966 may be configured as a network interface connected to the network such as a LAN and the Internet. That is, the external interface 966 serves as a transmission unit in the imaging apparatus 960.

The recording medium mounted on the media drive 968 may be an arbitrary readable/writable removable medium such as the magnetic disc, the magnetooptical disc, the optical disc, and the semiconductor memory, for example. It is also possible that the recording medium is fixedly mounted on the media drive 968 to compose a non-portable storage unit such as a built-in hard disc drive or SSD (Solid State Drive), for example.

The controller 970 includes the processor such as the CPU and the memory such as the RAM and the ROM. The memory stores the program executed by the CPU, the program data and the like. The program stored in the memory is read by the CPU at startup of the imaging apparatus 960 to be executed, for example. The CPU controls operation of the imaging apparatus 960 according to the operation signal input from the user interface 971, for example, by executing the program.

The user interface 971 is connected to the controller 970. The user interface 971 includes a button, a switch and the like for the user to operate the imaging apparatus 960, for example. The user interface 971 detects the operation by the user through the components to generate the operation signal and outputs the generated operation signal to the controller 970.

In the imaging apparatus 960 configured in this manner, the image processor 964 has a function of an image coding apparatus 100 (FIG. 1) according to the above-described embodiment. Therefore, the image processor 964 may limit motion prediction in consideration of the accuracy of a motion vector. Therefore, the image processor 964 may inhibit an increase in load while inhibiting a decrease in coding efficiency to code an image. Therefore, the imaging apparatus 960 may lower the inhibition of the coding efficiency.

Meanwhile, the image processor 964 also has a function of an image decoding apparatus 200 (FIG. 14) according to the above-described embodiment. Therefore, it may be configured that the image processor 964 decodes only coded data generated by coding in which the accuracy of the motion vector is taken into consideration in the limitation of the motion prediction. Therefore, the image processor 964 may more surely decode the coded data in which the decrease in coding efficiency is inhibited. Therefore, the imaging apparatus 960 may more surely realize the inhibition of the decrease in coding efficiency.

It goes without saying that the image coding apparatus and the image decoding apparatus to which the present technology is applied may be applied to the apparatus and system other than the above-described apparatus.

Meanwhile, an example in which the quantization parameter is transmitted from the coding side to the decoding side has been described in this specification. It is possible that a method of transmitting a quantization matrix parameter is transmitted or recorded as separate data associated with the coded bit stream instead of being multiplexed with the coded bit stream. Herein, the term "associate" means that the image included in the bit stream (or a part of the image such as a slice and a block) and information corresponding to the image may be linked with each other at the time of decoding. That is, the information may be transmitted on a transmission channel other than that of the image (or bit stream). Also, the information may be recorded on the recording medium other than that of the image (or bit stream) (or another recording area of the same recording medium). Further, it is possible that the information and the image (or bit stream) are associated with each other in an arbitrary unit such as a plurality of frames, one frame, or a part of the frame, for example.

Although preferred embodiments of this disclosure have been described in detail with reference to the attached drawings, the technical scope of this disclosure is not limited to such examples. It is clear that one of ordinary skill in the technical field of the present disclosure may conceive of various variations and modifications within the scope of the technical idea recited in claims and it is understood that they naturally belong to the technical scope of the present disclosure.

Meanwhile, the present technology may also have a following configuration.

(1) An image processing apparatus including: a controller which controls candidates for an inter prediction mode in which motion compensation is performed based on accuracy of a motion vector; a motion search unit which performs a motion search only in inter prediction modes allowed by the controller to be the candidates to generate a motion vector; and a motion compensation unit which performs the motion compensation in the inter prediction mode selected from the candidates in each of which the motion vector is generated by the motion search unit to generate a predicted image.

(2) The image processing apparatus according to (1) described above, wherein the controller controls whether to make the inter prediction mode the candidate according to whether the accuracy of the motion vector is integral accuracy or fractional accuracy.

(3) The image processing apparatus according to (2) described above, wherein the controller controls whether to make the inter prediction mode the candidate according to whether the accuracy in vertical and horizontal directions of the motion vector is the integral accuracy or the fractional accuracy.

(4) The image processing apparatus according to (3) described above, wherein the controller further controls whether to make the inter prediction mode the candidate according to whether a prediction mode is uni-prediction or bi-prediction.

(5) The image processing apparatus according (4) described above, wherein the controller further controls whether to make the inter prediction mode the candidate according to a size of an area being a prediction processing unit.

(6) The image processing apparatus according to any one of (1) to (5) described above, wherein the controller controls whether to make the inter prediction mode the candidate according to whether information regarding a size of a data reading amount from a memory determined according to the accuracy of the motion vector exceeds an upper limit by resources and a user instruction.

(7) The image processing apparatus according to any one of (1) to (6) described above, further including: a transmission unit which generates transmission information indicating a detail of control by the controller to be transmitted.

(8) The image processing apparatus according to (7) described above, wherein the transmission unit defines a profile and a level as the transmission information and includes information indicating the profile and the level in a sequence parameter set to be transmitted.

(9) The image processing apparatus according to any one of (1) to (8) described above, further including: a cost function calculation unit which calculates a cost function value for each candidate in which the motion vector is generated by the motion search unit; and a mode selector which selects the inter prediction mode in which the motion compensation is performed from the candidates based on the cost function value calculated by the cost function calculation unit, wherein the motion compensation unit performs the motion compensation in the inter prediction mode selected by the mode selector.

(10) An image processing method of an image processing apparatus, wherein a controller controls candidates for an inter prediction mode in which motion compensation is performed based on accuracy of a motion vector, a motion search unit performs a motion search only in inter prediction modes allowed to be the candidates to generate the motion vector, and a motion compensation unit performs the motion compensation in the inter prediction mode selected from the candidates in each of which the motion vector is generated to generate a predicted image.

(11) An image processing apparatus including: an obtaining unit which obtains control information to control a candidate for an inter prediction mode in which motion compensation is performed used in inter prediction when image data is coded based on accuracy of a motion vector; a determination unit which determines possibility of decoding of coded data generated by coding of the image data based on the control information obtained by the obtaining unit; and a controller which controls the decoding of the coded data based on a result of determination by the determination unit.

(12) The image processing apparatus according to (11) described above, wherein the determination unit determines the possibility depending on whether information regarding a size of a data reading amount from a memory specified by the control information obtained by the obtaining unit exceeds an upper limit by resources and a user instruction.

(13) The image processing apparatus according to (12) described above, wherein the determination unit determines the possibility depending on whether the information regarding the size of the data reading amount from the memory defined by a profile and a level exceeds the upper limit by the resources and the user instruction.

(14) The image processing apparatus according to any one of (11) to (13) described above, wherein the controller allows the decoding of the coded data to be executed only when the determination unit determines that the decoding is possible.

(15) The image processing apparatus according to any one of (11) to (14) described above, further including: an error processor controlled by the controller to perform an error process when the determination unit determines that the decoding is not possible.

(16) An image processing method of an image processing apparatus, wherein an obtaining unit obtains control information to control a candidate for an inter prediction mode in which motion compensation is performed used in inter prediction when image data is coded based on accuracy of a motion vector, a determination unit determines possibility of decoding of coded data generated by coding of the image data based on the obtained control information, and a controller controls the decoding of the coded data based on a determination result.

REFERENCE SIGNS LIST

100 Image coding apparatus, 115 Motion prediction/compensation unit, 121 Motion vector controller, 151 Motion search unit, 152 Cost function calculation unit, 153 Mode determination unit, 154 Motion compensation unit, 155 Motion information buffer, 161 Limitation information storage unit, 162 Limitation controller, 163 Transmission information providing unit, 171 Condition obtaining unit, 172 Limitation controller, 200 Image decoding apparatus, 212 Motion prediction/compensation unit, 221 Decoding controller, 251 Transmission information obtaining unit, 252 Limitation information storage unit, 253 Possibility determination unit, 254 Controller, 255 Error processor, 271 Condition obtaining unit, 273 Possibility determination unit

The invention claimed is:
1. An image processing apparatus, comprising:
a memory configured to store limitation information that corresponds to a first limitation of inter prediction modes;
a controller configured to:
obtain a first plurality of candidates for inter prediction modes with the first limitation based on the stored limitation information,
set a second limitation by an accuracy of a motion vector, based on a maximum value of a number of input pixels of a reference image,
wherein the reference image is used to generate a predicted image,
limit a number of the obtained first plurality of candidates to a number of a second plurality of candidates for inter prediction modes, in which motion compensation is executed, based on the second limitation set by the accuracy of the motion vector,
wherein the accuracy of the motion vector is represented by a type of the accuracy in at least one of a vertical direction or a horizontal direction of the motion vector, and
limit the number of the second plurality of candidates for the inter prediction modes based on at least one of an integral accuracy of the motion vector or a fractional accuracy of the motion vector;
a motion search unit configured to:
execute a motion search in the inter prediction modes allowed by the controller as the second plurality of candidates to generate the motion vector, and obtain a difference in pixel values between an input image and the reference image to generate a difference image;

a motion compensation unit configured to execute the motion compensation in the inter prediction modes selected from the second plurality of candidates, wherein the motion vector is generated by the motion search unit to generate the predicted image, and an arithmetic unit configured to add the difference image and the predicted image to generate a reconstructed image.

2. The image processing apparatus according to claim 1, wherein the controller is further configured to limit the number of the second plurality of candidates for the inter prediction modes based on a determination that the accuracy in at least one of the vertical direction or the horizontal direction of the motion vector is one of the integral accuracy or the fractional accuracy.

3. The image processing apparatus according to claim 2, wherein the controller is further configured to limit the number of the second plurality of candidates for the inter prediction modes based on a prediction mode that is one of uni-prediction or bi-prediction.

4. The image processing apparatus according to claim 3, wherein the controller is further configured to limit the number of the candidates for the inter prediction modes based on a size of a prediction processing unit.

5. The image processing apparatus according to claim 1, wherein the controller is further configured to:
determine a size of a data amount read from the memory, based on the accuracy of the motion vector; and
limit the number of the second plurality of candidates for the inter prediction modes based on the size of the data amount read from the memory that exceeds at least one of an upper limit by resources or a user instruction.

6. The image processing apparatus according to claim 1, further comprising:

a transmission unit configured to generate transmission information indicating a detail of control by the controller.

7. The image processing apparatus according to claim 6, wherein the transmission unit is further configured to:
define a profile and a level as the transmission information; and
transmit information indicating the profile and the level in a sequence parameter set.

8. The image processing apparatus according to claim 1, further comprising:

a cost function calculation unit configured to calculate a cost function value for each of the second plurality of candidates in which the motion vector is generated by the motion search unit; and a mode selector configured to select the inter prediction modes, in which the motion compensation is executed, from the second plurality of candidates based on the cost function value calculated by the cost function calculation unit, wherein the motion compensation unit is further configured to execute the motion compensation in the inter prediction modes selected by the mode selector.

9. An image processing method, comprising:
in an image processing apparatus:
storing limitation information that corresponds to a first limitation of inter prediction modes;
obtaining a first plurality of candidates of inter prediction modes with the first limitation based on the stored limitation information;
setting a second limitation by an accuracy of a motion vector based on a maximum value of a number of input pixels of a reference image,
wherein the reference image is used to generate a predicted image;
limiting a number of the obtained first plurality of candidates to a number of a second plurality of candidates for inter prediction modes, in which motion compensation is executed, based on the second limitation set by the accuracy of the motion vector,
wherein the accuracy of the motion vector is represented by a type of the accuracy in at least one of a vertical direction or a horizontal direction of the motion vector,
limiting the number of the second plurality of candidates for the inter prediction modes based on at least one of an integral accuracy of the motion vector or a fractional accuracy of the motion vector;
executing a motion search in the inter prediction modes allowed as the second plurality of candidates to generate the motion vector;
obtaining a difference in pixel values between an input image and the reference image to generate a difference image;
executing the motion compensation in the inter prediction modes selected from the second plurality of candidates,
wherein the motion vector is generated to generate the predicted image, and
adding the difference image and the predicted image to generate a reconstructed image.

10. An image processing apparatus, comprising:
an obtaining unit configured to obtain control information to:
limit a number of a first plurality of candidates to a number of second plurality of candidates for an inter prediction mode in which motion compensation is executed, for image data that is coded based on a second limitation set by an accuracy of a motion vector, and
limit the number of the second plurality of candidates for the inter prediction modes based on at least one of an integral accuracy of the motion vector or a fractional accuracy of the motion vector,
wherein the first plurality of candidates are obtained based on a first limitation that corresponds to inter prediction modes that are prohibited in advance,
wherein the accuracy of the motion vector is represented by a type of the accuracy in at least one of a vertical direction or a horizontal direction of the motion vector,
wherein the second limitation is set by the accuracy of the motion vector based on a maximum value of a number of input pixels of a reference image, and
wherein the reference image is used to generate a predicted image;
a determination unit configured to determine possibility of decoding of coded data based on the control information obtained by the obtaining unit, wherein the coded data is generated by the image data that is coded;

a controller configured to control the decoding of the coded data based on the determination by the determination unit;

a motion search unit configured to obtain a difference in pixel values between an input image and the reference image to generate a difference image; and an arithmetic unit configured to add the difference image and the predicted image to generate a reconstructed image.

11. The image processing apparatus according to claim 10, wherein the determination unit is further configured to determine the possibility based on a size of a data amount read from a memory specified by the control information that exceeds at least one of an upper limit by resources or a user instruction.

12. The image processing apparatus according to claim 11, wherein the determination unit is further configured to determine the possibility based on the size of the data amount read from the memory defined by a profile and a level that exceeds the at least one of the upper limit by the resources or the user instruction.

13. The image processing apparatus according to claim 10, wherein the controller is further configured to allow the decoding of the coded data to be executed based on the possibility of the decoding of the coded data.

14. The image processing apparatus according to claim 10, further comprising:

an error processor controlled by the controller to execute an error process based on the possibility of the decoding of the coded data.

15. An image processing method, comprising:

in an image processing apparatus:

obtaining control information to:
    limit a number of a first plurality of candidates to a number of second plurality of candidates for an inter prediction mode in which motion compensation is executed, for image data that is coded based on a second limitation set by an accuracy of a motion vector, and
    limit the number of the second plurality of candidates for the inter prediction modes based on at least one of an integral accuracy of the motion vector or a fractional accuracy of the motion vector,
    wherein the first plurality of candidates are obtained based on a first limitation that corresponds to inter prediction modes that are prohibited,
    wherein the accuracy of the motion vector is represented by a type of the accuracy in at least one of a vertical direction or a horizontal direction of the motion vector,
    wherein the second limitation is set by the accuracy of the motion vector based on a maximum value of a number of input pixels of a reference image, and
    wherein the reference image is used to generate a predicted image;

determining possibility of decoding of coded data based on the obtained control information, wherein the coded data is generated by the image data that is coded;

controlling the decoding of the coded data based on the determination of the possibility of the decoding of the coded data;

obtaining a difference in pixel values between an input image and the reference image to generate a difference image; and adding the difference image and the predicted image to generate a reconstructed image.

* * * * *